US012443120B2

(12) United States Patent
Suzumura et al.

(10) Patent No.: US 12,443,120 B2
(45) Date of Patent: Oct. 14, 2025

(54) TONER

(71) Applicant: CANON KABUSHIKI KAISHA, Tokyo (JP)

(72) Inventors: Yoshitaka Suzumura, Shizuoka (JP); Tomoko Sugita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 649 days.

(21) Appl. No.: 17/812,536

(22) Filed: Jul. 14, 2022

(65) Prior Publication Data

US 2023/0037779 A1 Feb. 9, 2023

(30) Foreign Application Priority Data

Jul. 21, 2021 (JP) ................................ 2021-120734

(51) Int. Cl.
*G03G 9/097* (2006.01)
*G03G 9/08* (2006.01)

(52) U.S. Cl.
CPC ....... *G03G 9/09716* (2013.01); *G03G 9/0819* (2013.01); *G03G 9/09725* (2013.01)

(58) Field of Classification Search
CPC ............. G03G 9/09716; G03G 9/0819; G03G 9/09725; G03G 9/08; C08K 3/22; C08K 9/06
See application file for complete search history.

(56) References Cited

U.S. PATENT DOCUMENTS

| | | | |
|---|---|---|---|
| 6,800,413 | B2 | 10/2004 | Barthel et al. |
| 7,811,734 | B2 | 10/2010 | Ogawa |
| 8,227,162 | B2 | 7/2012 | Sano |
| 8,426,094 | B2 | 4/2013 | Magome |
| 8,614,044 | B2 | 12/2013 | Matsui |
| 8,778,585 | B2 | 7/2014 | Matsui |
| 8,918,035 | B2 | 12/2014 | Hasegawa |
| 9,029,055 | B2 | 5/2015 | Aoki |
| 9,213,250 | B2 | 12/2015 | Nomura |
| 9,239,528 | B2 | 1/2016 | Hasegawa |
| 9,244,371 | B2 | 1/2016 | Suzumura |
| 9,417,542 | B2 | 8/2016 | Hiroko |
| 9,625,841 | B2 | 4/2017 | Hiroko |
| 9,804,514 | B2 | 10/2017 | Suzumura |
| 9,804,519 | B2 | 10/2017 | Suzumura |
| 9,841,692 | B2 | 12/2017 | Hasegawa |
| 9,927,728 | B2 | 3/2018 | Arimura |
| 9,946,179 | B2 | 4/2018 | Arimura |
| 9,946,181 | B2 | 4/2018 | Hasegawa |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,264 | B2 | 5/2018 | Sano |
| 10,012,923 | B2 | 7/2018 | Sano |
| 10,228,627 | B2 | 3/2019 | Nagashima |
| 10,310,397 | B2 | 6/2019 | Sano |
| 10,545,420 | B2 | 1/2020 | Kinumatsu |
| 10,698,327 | B2 | 6/2020 | Nagashima |
| 2009/0197192 | A1 | 8/2009 | Hiroko |
| 2016/0378003 | A1 | 12/2016 | Arimura |
| 2021/0080846 | A1 | 3/2021 | Mizuguchi |
| 2021/0356878 | A1 | 11/2021 | Mizuguchi |
| 2022/0146952 | A1 | 5/2022 | Komiya |
| 2022/0146955 | A1 | 5/2022 | Nozaki |
| 2022/0171301 | A1 | 6/2022 | Suzumura |

FOREIGN PATENT DOCUMENTS

| | | | | | |
|---|---|---|---|---|---|
| JP | 4-355461 | A | | 12/1992 | |
| JP | 9-146296 | A | | 6/1997 | |
| JP | 2003-176122 | A | | 6/2003 | |
| JP | 2004-145325 | A | | 5/2004 | |
| JP | 2005-55733 | A | | 3/2005 | |
| JP | 3978520 | B2 | * | 9/2007 | ............... C08K 3/22 |
| JP | 2009-292915 | A | | 12/2009 | |
| JP | 2012-78630 | A | | 4/2012 | |
| JP | 2015125258 | A | * | 7/2015 | ............... G03G 9/08 |
| JP | 2016-142760 | A | | 8/2016 | |

OTHER PUBLICATIONS

Machine translation of JP 2015-125258 A, Mochizuki (Year: 2025).*
Machine translation of JP 3978520 B2, Eiji (Year: 2025).*
U.S. Appl. No. 17/659,273, Tomohiro Unno, filed Apr. 14, 2022.
U.S. Appl. No. 17/660,138, Keisuke Adachi, filed Apr. 21, 2022.
U.S. Appl. No. 17/660,146, Atsuhiko Ohmori, filed Apr. 21, 2022.
U.S. Appl. No. 17/808,835, Dai Nozaki, filed Jun. 24, 2022.

* cited by examiner

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle, and an external additive on a surface of the toner particle, wherein the external additive comprises an agglomerate of fine silica particles surface-treated with silicone oil; when a number-average particle diameter of the agglomerate of the fine silica particles is defined as Rb, the Rb is 12 to 80 nm; when an integrated value of a D unit is defined as A, which obtained when an integrated value of a Q unit is set to 100 in a CP/MAS measurement in a $^{29}$Si-solid-state NMR of the fine silica particles, the A is 120 to 300, and the agglomerate of the fine silica particles has a coefficient of variation of particle diameters of 1.00 to 3.00, based on a number of the agglomerate of the fine silica particles.

9 Claims, 3 Drawing Sheets

TONER

BACKGROUND OF THE INVENTION

Field of the Invention

The present disclosure relates to a toner used for an image-forming method such as electrophotography.

Description of the Related Art

In recent years, image forming apparatuses such as copiers or printers are required to show higher speed, higher image quality, and higher stability as the progress of diversification of the purposes of use and the operating environments. Electrophotography goes through a charge step of charging an electrostatic latent image bearing member (hereinafter referred to as a photoreceptor) with charging means, an exposing step of exposing the charged electrostatic latent image bearing member to form an electrostatic latent image, and a development step of developing the electrostatic latent image with a toner to form a toner image. Next, the process further goes through a transfer step of transferring the toner image to a recording material via or not via an intermediate transfer member and a fixing step of heat and pressure fixing the toner image on a recording material that carries the toner image by passing the recording material through a nip part formed by a pressurizing member and a rotatable image-heating member, and the image is finally outputted.

In order to respond to the recent request for increasing speed, extending life, and saving energy, optimization of each of the steps is important. Among them, it is conventionally important to perform a development step of developing an electrostatic latent image with a toner to form a toner image, particularly for increasing speed and extending life, and to fix an image sufficiently at a low temperature for saving energy.

Studies have been conducted from the viewpoint of improving external additives of toner as means of improving the durability. Japanese Patent Application Publication No. 2016-142760 discloses a toner with durability improved by improving the state of the external additives of the toner.

SUMMARY OF THE INVENTION

The studies by the present inventors revealed that the toner in Japanese Patent Application Publication No. 2016-142760 had excellent low-temperature fixability and durability. On the other hand, the present inventors have recognized that there is room for improvement in extending the life of the recent image formation process. Specifically, fogs occur when the toner level is very low in a durability test, and a phenomenon that a conspicuous fog image is outputted as an irregular fog image.

The present disclosure directs to provide a toner with excellent durability and capable of suppressing fogs even when the toner is applied to a high-speed electrophotrographic image formation process.

The present disclosure relates to a toner comprising a toner particle, and an external additive on a surface of the toner particle, wherein the external additive comprises an agglomerate of fine silica particles surface-treated with silicone oil;

when a number-average particle diameter of the agglomerate of the fine silica particles is defined as Rb, the Rb is 12 to 80 nm;

when an integrated value of a D unit is defined as A, which obtained when an integrated value of a Q unit is set to 100 in a CP/MAS measurement in a $^{29}$Si-solid-state NMR of the fine silica particles, the A is 120 to 300, and the agglomerate of the fine silica particles has a coefficient of variation of particle diameters of 1.00 to 3.00, based on a number of the agglomerate of the fine silica particles.

According to the present disclosure, a toner with excellent durability and capable of suppressing fogs even when applied to a high-speed electrophotrographic image formation process can be obtained.

Further features of the present invention will become apparent from the following description of exemplary embodiments with reference to the attached drawings.

DESCRIPTION OF THE EMBODIMENTS

Figure 1:
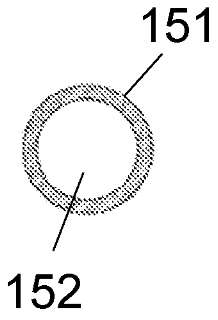
FIG. 1 is a schematic view illustrating an example of a treated state of a fine silica particle.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

For example, in order to improve the durability of a toner, there is a method of selecting an external additive to be used for the toner and controlling the existing state of the external additive in the toner. Specifically, using a large amount of a small-diameter inorganic external additive tends to improve the flowability of the toner, and as a result, tends to improve the durability of the toner.

However, there may cause a problem from the viewpoint of the change of the state of the external additive in a toner in a durability test. The toner on the developing roller is rubbed by the developing blade, which causes the external additive in the toner to be embedded or the external additive in an agglomerated state to be deagglomerated. This toner herein refers to a "deteriorated toner" as a general name. The existing state of external additives in a deteriorated toner changes compared to a toner before a durability test, and therefore, the charging performance also tends to be lower.

When this deteriorated toner, in which the state of the external additives changed, is not developed, the deteriorated toner remains on the development roller. When this process is repeated, a large amount of deteriorated toner is remained on the developer roller. A large number of further deteriorated toners tend to exist on the development roller in the latter half of the durability test, where the toner levels become small. At this time, a phenomenon where a toner that has not relatively deteriorated in a toner cartridge container is mixed with the toner on the development roller may occur.

In this case, toner with normal charging performance and toner with abnormal charging performance coexist on a development roller, which causes a problem that a conspicuous irregular fog image is outputted due to the toner with abnormal charging performance. This problem tends to occur when the toner level becomes very small in a durability test. In particular, this problem is frequently observed in a toner cartridge that meets the requirement for extending the life and a toner cartridge that includes downsized members.

Based on the above state of the art, the present inventors have focused on the existing state of the external additives of a toner in a durability test and repeated studies. As a result, the present inventors have found that the above requirements can be well met by using an external additive in an agglomerated state and maintaining the agglomerated state during a durability test. Specifically, the present inventors have found that the above requirements can be well met by adhering fine silica particles with relatively high parameter A as described later to the toner particle surface in an agglomerated form and making the diameter of the agglomerates uniform. That is, the present disclosure relates to the following toner.

The present disclosure relates to a toner comprising a toner particle, and an external additive on a surface of the toner particle, wherein the external additive comprises an agglomerate of fine silica particles surface-treated with silicone oil;

when a number-average particle diameter of the agglomerate of the fine silica particles is defined as Rb, the Rb is 12 to 80 nm;

when an integrated value of a D unit is defined as A, which obtained when an integrated value of a Q unit is set to 100 in a CP/MAS measurement in a $^{29}$Si-solid-state NMR of the fine silica particles, the A is from 120 to 300, and the agglomerate of the fine silica particles has a coefficient of variation of particle diameters of 1.00 to 3.00, based on a number of the agglomerate of the fine silica particles.

As a result of the study by the present inventors, a toner with excellent durability and capable of reducing the fog at the final phase of durability by using the toner described above.

Figure 2:
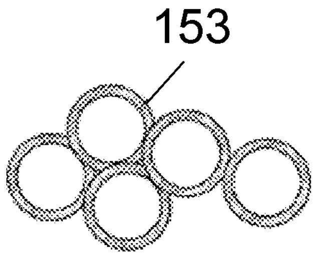
FIG. 2 is a schematic view illustrating an example of an agglomerate of fine silica particles.

The toner comprises a toner particle and an external additive on the surface of the toner particle. Then, the external additive comprises agglomerates of fine silica particles surface-treated with silicone oil. This means that fine silica particles existing on the toner particle surface form an agglomerate. FIG. 1 is a schematic view illustrating a primary particle of a fine silica particle. 151 indicates a treating agent for fine silica particles, and 152 indicates a fine silica particle. FIG. 2 is a schematic view illustrating an agglomerate of fine silica particles, and 153 indicates fine silica particles in an agglomerated form. Agglomerates can be confirmed by separating fine silica particles contained in the toner and observing the separated fine silica particles by the method described later.

When the fine silica particles on the toner particle surface form an agglomerate, the agglomerate of fine silica particles comes into contact with the toner particle surface at multiple points, which can disperse the pressure when a force in the direction to be embedded is applied thereto. Thus, the fine silica particles can be suppressed from being embedded by the rubbing from a development blade, compared to the case where fine silica particles exist on the toner particle surface alone as a primary particle.

The number-average particle diameter Rb of the agglomerate of fine silica particles is 12 to 80 nm. Rb means a number-average particle diameter of agglomerates of fine silica particles existing on the toner particle surface. The Rb of the fine silica particles contained in a toner can be calculated by the method described later. An Rb within this range can provide a toner with good flowability. Therefore, the toner on a development roller and the toner in a toner cartridge container circulate more easily, and, as a result, a deteriorated toner is less likely to accumulate on the development roller.

The number-average particle diameter Rb of the agglomerate of fine silica particles is preferably 15 to 40 nm, and more preferably 20 to 30 nm. The number-average particle diameter Rb can be larger by increasing the amount of silicone oil, which will be described later, of fine silica particles or using modified silicone oil, which will be described later. Furthermore, the number-average particle diameter Rb may be made smaller by reducing the amount of the silicone oil of fine silica particles.

A (parameter A), which is an integrated value of a D unit determined when an integrated value of a Q unit in a CP/MAS measurement in a $^{29}$Si-solid-state NMR of the fine silica particles is set to 100, is required to be 120 to 300.

The parameter A, which was described above, and the parameter B and A/B, which will be described later, are calculated by $^{29}$Si-solid-state NMR. In a $^{29}$Si-solid-state NMR, four peaks of an M unit (Formula (4)), a D unit (Formula (5)), a T unit (Formula (6)), and a Q unit (Formula (7)) can be observed for silicon atoms in a solid sample.

| | |
|---|---|
| M unit: $(Ri)(Rj)(Rk)SiO_{1/2}$ | Formula (4) |
| D unit: $(Rg)(Rh)Si(O_{1/2})_2$ | Formula (5) |
| T unit: $RmSi(O_{1/2})_3$ | Formula (6) |
| Q unit: $Si(O_{1/2})_4$ | Formula (7) |

The Ri, Rj, Rk, Rg, Rh, and Rm in Formulas (4), (5), and (6) represent alkyl groups such as hydrocarbon groups with 1 to 6 carbons, halogen atoms, hydroxy groups, acetoxy groups, carbinol groups, epoxy groups, carboxy groups, hydrogen atoms, or an alkoxy groups bonded to silicon.

The $^{29}$Si-solid-state NMR measurement uses two types of measurement

The $^{29}$Si-solid-state NMR measurement uses two types of measurement methods, a DD/MAS measurement method and a CP/MAS measurement method. The DD/MAS measurement method brings information about the silicon atom content because all silicon atoms in a measurement sample are observed. When fine silica particles surface-treated with silicone oil are measured by a DD/MAS measurement, the Q unit represents a peak corresponding to the untreated base material fine silica particle, and the D unit represents a peak corresponding to silicone oil, which is a treating agent. That is, when the integrated value of the D unit, determined when the integrated value of the Q unit in a DD/MAS measurement is set to 100, is taken as B (parameter B), the parameter B means an amount of silicone oil to a base material fine silica particle. For example, B becomes larger as the amount of silicone oil existing on the surface of a base material fine silica particle is larger. B is preferably 20 to 60, and more preferably 30 to 50.

Meanwhile, silicon atoms, in the vicinity of which hydrogen atoms exist, are observed with high sensitivity because the CP/MAS measurement is conducted while magnetizing via the hydrogen atoms existing in the vicinity of the silicon atoms. The existence of hydrogen atoms in the vicinity of silicon atoms means that the molecular motility of a measurement sample is low. That is, the silicon atoms are observed with higher sensitivity as the molecular motility of a measurement sample is lower and the amount thereof is larger. That is, when a fine silica particle surface-treated with silicone oil is measured by a CP/MAS measurement, the parameter A includes not only information about the amount of the silicone oil in relation to base material fine silica particles but also information about the molecular motility of the silicone oil. For example, A indicates a larger value as the amount of silicone oil with low molecular motility existing on the surface of a base material fine silica particle is larger.

The present inventors have made an intensive study and, as a result, found that fine silica particles that show high parameter A value is likely to maintain the shape of agglomerates of fine silica particles even when the agglomerates receive rubbing from a development blade in a durability test.

The toner comprises an agglomerate of fine silica particles surface-treated with silicone oil. Therefore, silicone oil exists inside the agglomerate of fine silica particles. The study made by the present inventors revealed that a phenomenon that the agglomerate of fine silica particles deagglomerates when a toner receives the rubbing from a development blade in a durability test occurs when the degree of freedom of silicone oil is high. This is presumably due to the fact that silicone oil with a high degree of freedom, existing inside the agglomerates, moves at the molecular level, making it easier for the fine silica particles to be deagglomerated.

The fine silica particles have a parameter A indicating the degree of freedom of silicone oil from 120 to 300, which indicates that the degree of freedom of silicone oil is low. A parameter A satisfying the above range allows an agglomerate of fine silica particles to maintain the shape thereof through a durability test, which results in the suppression of toner deterioration. If the parameter A is less than 120, the shape of an agglomerate of fine silica particles tends to be difficult to maintain through a durability test, which fails to suppress toner deterioration. If the parameter A exceeds 300, the degree of freedom of silicone oil is too low to be difficult to control the coefficient of variation, which will be described later, to be within a predetermined range.

The parameter A is preferably from 140 to 200 and more preferably from 150 to 170. The parameter A can be larger by increasing the amount of modified silicone oil used for treating fine silica particles and using a low viscosity silicone oil for the purpose of making the molecular chain of silicone oil short. In addition, the parameter A can be made small by using modified silicone oil and silicone oil in combination.

The coefficient of variation of particle diameters based on the number of the agglomerate of fine silica particles satisfies the range from 1.00 to 3.00. This means that the size of the agglomerate of fine silica particles existing on the toner particle surface is relatively uniform. The coefficient of variation can be calculated by separating fine silica particles contained in the toner by the method described later.

Fine silica particles form an agglomerate, and therefore, a phenomenon that agglomerates on the toner particle surface bite into each other is likely to occur. The flowability of toner tends to decrease due to this phenomenon, and as a result, the replacement of toner on the developing roller with toner in the toner cartridge is inhibited. In contrast, the present inventors have found that making the size of the agglomerates uniform allows the flowability of toner to be maintained well.

If the size of the agglomerate is uneven, a phenomenon that smaller agglomerates are caught in the gaps between larger agglomerates occurs. On the other hand, it is considered that this phenomenon hardly occurs and the flowability could be good when the size of the agglomerate was uniform. The theoretical lower limit value of the coefficient of variation is 0.00, which means that the size of the agglomerates is completely uniform.

Meanwhile, a coefficient of variation of 3.00 or less allows a phenomenon that agglomerates on the toner particle surface bite into each other to be suppressed, and good toner flowability can be maintained. The replacement of toner on the developing roller with toner in the toner cartridge thereby frequently occurs at the final phase of a durability test. This allows the localization of deteriorated toner on the development roller to be suppressed and irregular fog at the final phase of a durability test to be suppressed.

The coefficient of variation is preferably from 1.20 to 2.50, and more preferably from 1.45 to 2.40.

The agglomerate of fine silica particles with a high parameter A has a characteristic that the agglomerate is hardly deagglomerated in a durability test. Meanwhile, since the fine silica particles form hardly-deagglomeratable agglomerates, the size of the agglomerates on the toner particle surface tends to be uneven. In this case, deterioration of toner on a development roller may not be suppressed because deteriorated toner on the developing roller is less likely replaced with toner in the toner cartridge.

For example, a method for controlling the degree of freedom of silicone oil, such as the parameter A, the parameter A/B, which will be described later, of silicone oil, a production method including the step of deagglomerating fine silica particles, a production method including the step of externally adding fine silica particles while spreading may be mentioned in order to make the size of agglomerates on the toner particle surface uniform. Details will be described later.

The number-average particle diameter Ra of the primary particles of fine silica particles is preferably from 5 to 30 nm, more preferably from 5 to 15 nm, and still more preferably from 6 to 10 nm. This means that the size of the primary particles of the fine silica particles is relatively small. The replacement of toner on the developing roller with toner in the toner cartridge more frequently occurs with an Ra satisfying this range, and therefore, the accumulation of deteriorated toner on the development roller can be suppressed.

The number-average particle diameter Ra of primary particles of fine silica particles and the number-average particle diameter Rb of the agglomerates preferably satisfy the following expression (1) and more preferably satisfy the following expression (1').

$$2.5 \leq Rb/Ra \leq 5.0 \quad (1)$$

$$3.0 \leq Rb/Ra \leq 4.0 \quad (1')$$

This indicates the number of primary particles comprised in an agglomerate of fine silica particles. When the Rb/Ra satisfies the expression (1), the points of the agglomerate of fine silica particles coming into contact with the toner particle surface tend to be multiple, and the embedment of the agglomerate in a durability test can be more efficiently suppressed.

The external additive further comprises a non-agglomerated form of fine silica particles surface-treated with silicon oil, and the number proportion of the agglomerates of fine silica particles in the total number of agglomerates of the fine silica particles and the non-agglomerated form of fine silica particles is preferably 40 number % or more, more preferably 50 number % or more, and still more preferably 65 number % or more. The upper limit is not particularly limited, but the number proportion is preferably 99 number % or less and more preferably 95 number % or less.

The number proportion indicates a proportion of the non-agglomerated form and agglomerates of fine silica particles existing on the toner particle surface and means that the proportion of the agglomerates is relatively high. The embedment of the agglomerate in a durability test can be more efficiently suppressed when the number proportion satisfies 40 number % or more. The number proportion of the agglomerates of fine silica particles can be increased by using fine silica particles treated with modified silicone oil described later, or furthermore, using fine silica particles with a high A value. On the contrary, the number proportion of the agglomerates of fine silica particles can be decreased by extending the time for pre-mixing in the externally adding step or the like.

When an integrated value of a D unit, determined when an integrated value of a Q unit in a CP/MAS measurement in a $^{29}$Si-solid-state NMR of the fine silica particles is set to 100, is taken as A, and an integrated value of the D unit, determined when the integrated value of the Q unit in a DD/MAS measurement is set to 100, is taken as B, the A and B preferably satisfy the following expression (2) and more preferably satisfy the following expression (2').

$$3.0 \leq A/B \leq 6.0 \quad (2)$$

$$3.5 \leq A/B \leq 5.0 \quad (2')$$

As described above, the parameter A indicates the degree of the motility of silicone oil, and the parameter B indicates the degree of the amount of silicone oil to base material fine silica particles. The expression (2) indicates the degree of motility of silicone oil contained in the fine silica particles in relation to the amount of the silicone oil. The ratio AB satisfying the above range helps the control of the degree of deagglomeration of the agglomerate of fine silica particles to be within a suitable range. In addition, the shape of the agglomerate of the fine silica particles in a durability test is likely to be maintained, and the coefficient of variation of the particle diameters of the agglomerates can be easily controlled in a suitable range.

Binder Resin

The toner particle preferably comprises a binder resin. Examples of the binder resin include a vinylic resin, a polyester-based resin, an epoxy resin, a polyurethane resin, and the like. These known resins may be used without particular limitation. Among them, the toner particle preferably comprises at least one selected from the group consisting of a polyester resin and a vinylic resin from the viewpoint of balancing the charging performance and the fixing performance.

More preferably, the binder resin comprises a vinylic resin. Examples of polymerizable monomers (vinylic monomers) for producing a vinylic resin include the followings.

Styrene and derivatives thereof, styrene unsaturated monoolefins, unsaturated polyenes, vinyl halides, vinyl esters, α-methylene aliphatic monocarboxylic acid esters, acrylic acid esters, vinyl ethers, vinyl ketones, N-vinyl compounds, acrylic acid or meth acrylic acid derivatives, and the like may be mentioned.

Furthermore, monomers having a carboxy group, such as unsaturated dibasic acids, unsaturated dibasic acid anhydrides, half esters of unsaturated dibasic acids, unsaturated dibasic acid esters, α,β-unsaturated acids, α,β-unsaturated acid anhydrides, anhydrides of the α,β-unsaturated acids and lower fatty acids, alkenyl malonic acids, alkenyl glutaric acids, alkenyl adipic acids, anhydride of these and monoesters of these, and the like may be mentioned.

Furthermore, monomers having a hydroxy group, such as acrylic acid esters and methacrylic acid esters, 4-(1-hydroxy-1-methylbutyl)styrene, 4-(1-hydroxy-1-methylhexyl) styrene, and the like may be mentioned.

The vinylic resin may have a crosslinked structure with a crosslinking agent having two or more vinyl groups. Examples of the crosslinking agent include divinyl benzene.

Colorant

The toner particle may contain a colorant. Examples of the colorant include the followings.

Examples of organic pigments or organic dyes as cyan colorants include copper phthalocyanine compounds and derivatives thereof, anthraquinone compounds, and base dye lake compounds.

Examples of organic pigments or organic dyes as magenta colorants include the followings. Condensation azo compounds, diketo pyrrolo pyrrole compounds, anthraquinone, quinacridone compounds, base dye lake compounds, naphthol compounds, benzimidazolone compounds, thioindigo compounds, and perylene compounds.

Examples of organic pigments or organic dyes as yellow colorants include compounds typified by condensation azo compounds, isoindolinone compounds, anthraquinone compounds, azo metal complexes, methine compounds, and allyl amide compounds.

Examples of black colorants include carbon black, and colorants color-matched to black using the yellow colorant, the magenta colorant, and the cyan colorant described above.

When used, the colorant is preferably added and used in an amount of 1 to 20 parts by mass based on 100 parts by mass of the polymerizable monomers or binder resins. The toner particle may comprises a magnetic body as a black colorant. The magnetic body can also serve as a colorant.

The magnetic body is mainly composed of triiron tetraoxide, γ-iron oxide, or the like as a major component and may comprises an element such as phosphorus, cobalt, nickel, copper, magnesium, manganese, and aluminum. The shape of the magnetic body includes polyhedron, octahedron, hexahedron, a spherical shape, a needle shape, a scaly shape, and the like, and shapes with less anisotropy, such as polyhedron, octahedron, hexahedron, a spherical shape, and the like are preferred for increasing image density. The magnetic body content is preferably 50 to 150 parts by mass based on 100 parts by mass of polymerizable monomers or binder resins.

Wax

The toner particle preferably comprises a wax. The wax preferably comprises a hydrocarbon wax. Examples of other waxes include the followings. Amide waxes, higher fatty acids, long-chain alcohols, ketone waxes, ester waxes, and derivatives thereof, such as graft compounds and block compounds. Two or more waxes may be used in combination according to need.

Among them, hydrocarbon waxes produced by a Fischer-Tropsch process can keep hot offset resistance well while maintaining the developing performance well over a long period of time. It should be noted that these hydrocarbon wax may contain an antioxidant within a range that does not affect the charging performance of the toner.

The wax content is 4.0 to 30.0 parts by mass and more preferably 4.0 to 28.0 parts by mass based on 100 parts by mass of the binder resin.

Charge Control Agent

The toner particle may optionally comprises a charge control agent. Blending a charge control agent stabilizes the charge characteristics and enables controlling the optimal triboelectric charge quantity according to the development system.

Known charge control agents may be used as the charge control agent, and a charge control agent that shows high charging speed and can stably maintain a constant charge amount is particularly preferable. Furthermore, when the toner particle is produced by a direct polymerization method, a charge control agent that shows low polymerization inhibition performance and contains substantially no soluble matters to an aqueous medium is particularly preferred.

The toner particle may comprises a single charge control agent or two or more charge control agents in combination. The blending amount of the charge control agent is preferably 0.3 to 10.0 parts by mass and more preferably 0.5 to 8.0 parts by mass based on 100 parts by mass of the polymerizable monomer or the binder resin.

External Additive

The toner comprises an external additive on the surface of a toner particle. The external additive comprises an agglomerate of fine silica particles surface-treated with silicone oil. Charge stability, durable developing performance, flowability, and increase in durability can be achieved by adding fine silica particles to a toner particle as an external additive.

Other external additives may be further added to the toner according to need. Examples of such an external additive include fine resin particles and inorganic fine particles functioning as charge aids, conductivity-imparting agents, flowability-imparting agents, caking prevention agents, release agents at heat roller fixing, lubricants, abrasives, and the like.

Examples of the lubricants include polyfluoroethylene powder, zinc stearate powder, and polyvinylidene fluoride powder. As abrasives, cerium oxide powder, silicon carbide powder, and strontium titanate powder may be mentioned, and among them, strontium titanate powder is preferred.

Fine Silica Particles

Hereinafter, the fine silica particles are described. The external additive comprises agglomerates of fine silica particles surface-treated with silicone oil. In addition, the external additive preferably comprises a non-agglomerated form of fine silica particles surface-treated with silicone oil. A non-agglomerated form refers to fine silica particles existing in the form of primary particles.

Known materials may be used as the base material fine silica particles. Examples thereof include silicon compounds, particularly silicon halide, commonly silicon chloride, fumed silica normally produced by burning purified silicon tetrachloride in an oxyhydrogen flame, wet silica produced from water glass, sol-gel method silica particles obtained by wet processes, gel method silica particles, aqueous colloidal silica particles, alcoholic silica particles, fused silica particles obtained by gas phase method, and deflagration method silica particles.

The number-average particle diameter of the primary particles of fine silica particles before surface treatment with silicone oil of from 5 to 30 nm is preferable because high flowability and high charging performance can be sufficiently imparted to the toner. A number-average particle diameter of 5 nm or more suppresses the embedment of surface-treated fine silica particles to the toner particle surface more sufficiently and increases durability. A number-average particle diameter of 30 nm or less provides good flowability.

Furthermore, modified silicone oil is preferably used as the silicone oil used as a surface treating agent for fine silica particles. That is, the silicone oil preferably comprises modified silicone oil. When modified silicone oil is used, the modified silicone oil firmly adheres to the surface of fine silica particles, and therefore, the molecular motility of the modified silicone oil becomes low. Accordingly, controlling the parameter A to a high range is easier. As a result, the shape of the agglomerate of fine silica particles in a durability test can be more easily maintained, and the fog irregularity at the final phase of durability can be more sufficiently suppressed because the production of deteriorated toner can be suppressed.

The modified silicone oil is preferably modified silicone oil having a reactive group at a silicone oil molecular chain terminal, such as the compound represented by the formula (B) described below. A silicone oil having a reactive group at a molecular chain terminal forms a chemical bond at a molecular terminal with a silanol group on the surface of untreated base material fine silica particles, and therefore, the motility of the silicone oil decreases. As a result, the shape of the agglomerate of fine silica particles in a durability test can be more easily maintained, and the fog at the final phase of durability can be more sufficiently suppressed because the production of deteriorated toner can be suppressed.

(B)

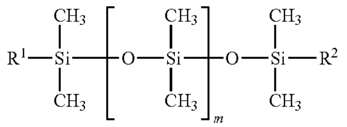

In the formula, $R^1$ represents a carbinol group, a hydroxy group, an epoxy group, a carboxy group, an alkyl group (preferably alkyl with 1 to 6 carbons, more preferably alkyl with 1 to 3 carbons), or a hydrogen atom, and $R^2$ represents a carbinol group, a hydroxy group, an epoxy group, a carboxy group, or a hydrogen atom. Preferably, $R^1$ and $R^2$ each independently represent a carbinol group, a hydroxy group, or a hydrogen atom. The methyl groups in a side chain in the formula (B) may each independently be replaced with a carbinol group, a hydroxy group, an epoxy group, a carboxy group, or a hydrogen atom.

m represents an average repeating unit number and is a number such that a kinematic viscosity of modified silicone oil at a temperature of 25° C. is 20 to 1000 $mm^2/s$ (more preferably 25 to 200 $mm^2/s$, and more preferably 30 to 70 $mm^2/s$). For example, m is 30 to 200 (preferably 40 to 100, and more preferably 50 to 80).

More preferably, modified silicone oil having hydroxy groups at both terminals, as indicated in the formula (D) described below, is preferably used. A hydroxy group existing at a molecular terminal forms a strong siloxane bond with a silanol group on the surface of base material fine silica particles. Accordingly, the molecular motility of the modified silicone oil firmly adhered to the surface of base material fine silica particles is lower. The shape of the agglomerate of fine silica particles in a durability test can thereby be more easily maintained, and the fog at the final phase of durability can be more sufficiently suppressed because the production of deteriorated toner can be suppressed.

(D)

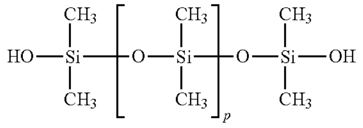

In the formula (D), p represents an average repeating unit number and is a number such that a kinematic viscosity of modified silicone oil at a temperature of 25° C. is 20 to 1000 $mm^2/s$ (more preferably 25 to 200 $mm^2/s$, and more preferably 30 to 70 $mm^2/s$). For example, p is 30 to 200 (preferably 40 to 100, and more preferably 50 to 80).

In addition, fine silica particles are sufficiently hydrophobized when modified silicone oil is used in combination with polydimethylsiloxane as represented by the formula (A), and the charging performance is thereby further increased.

(A)

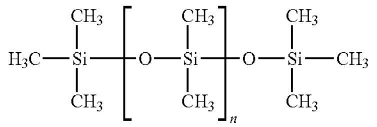

n represents an average repeating unit number and is a number such that a kinematic viscosity of polydimethylsiloxane at a temperature of 25° C. is 20 to 1000 $mm^2/s$ (more preferably 25 to 200 $mm^2/s$, and more preferably 30 to 70 $mm^2/s$). For example, n is 30 to 200 (preferably 40 to 100, and more preferably 50 to 80).

The treatment of fine silica particles with silicone oil can be conducted by a known wet process or a dry process. It is preferred to conduct the treatment under a state where fine silica particles are dispersed such that fine silica particles mechanically have a suitable agglomerate diameter using these methods.

The silicone oil represented by the formula (B) or the formula (A) is preferably a highly volatile one that can be efficiently evaporated or removed in the surface treatment described later. Accordingly, the silicone oil represented by the formula (B) or the formula (A) is preferably one with a relatively small molecular weight. The molecular weight of silicone oil correlates with the kinematic viscosity of silicone oil, and a lower kinematic viscosity indicates a lower molecular weight. A silicone oil with a low kinematic viscosity has many reaction points with fine silica particles, and the parameter A of fine silica particles tends to be higher. The range of the kinematic viscosity at a temperature of 25° C. is preferably 20 to 1000 $mm^2/s$, more preferably 25 to 200 $mm^2/s$, and still more preferably 30 to 70 $mm^2/s$.

The amount of the silicone oil used in the surface treatment of fine silica particles varies depending on the type of fine silica particles (specific surface area or the like), the type of the silicone oil (molecule weight or the like), or the like. The amount is preferably 1 to 40 parts by mass, more preferably 2 to 35 parts by mass, and still more preferably 5 to 30 parts by mass based on 100 parts by mass of fine silica particles. The amount satisfying this range allows for increased hydrophobicity and also makes it easier to control the coefficient of variation within a specific range.

Surface Treatment Method

The surface treatment method is preferably conducted under an inert gas atmosphere such as a nitrogen atmosphere in order to prevent hydrolysis and oxidation. Specifically, a method is adopted, including putting base material fine silica particles in a container provided with a mixing device such as a Henschel mixer, stirring the fine silica particles under a nitrogen purge, spraying a diluting solution of silicone oil, mixing the solution with the base material fine silica particles, and heating the mixture so as to cause a reaction. The spraying may be conducted prior to heating, or may be conducted while heating at a treatment temperature or below.

Treatment Condition

The surface treatment is a treatment for reacting silicone oil with the surface of base material fine silica particles and fixing the silicone oil on the surface by providing a given amount of the silicone oil described above to base material fine silica particles and heating the silicone oil under mixing. Here, the silicone oil may be diluted with various solvents described above and provided to base material fine silica particles.

The heating temperature in this surface treatment varies depending on the reactivity of used silicone oil or the like and is preferably 150° C. to 350° C. and more preferably 250° C. to 320° C. The processing time varies depending on the heating temperature and the reactivity of used silicone oil, or the like, and is preferably 5 to 300 minutes, more preferably 30 to 200 minutes, and more preferably 60 to 150 minutes. The above range allows the silicone oil to react sufficiently with base material fine silica particles.

The total content of the agglomerates of fine silica particles and a non-agglomerated form of fine silica particles is preferably 0.10 to 4.00 parts by mass, more preferably 0.20 to 3.50 parts by mass, still more preferably 0.20 to 1.00 parts by mass, and further preferably 0.30 to 0.50 parts by mass based on 100 parts by mass of the toner particle from the viewpoint of increasing the flowability and charging performance.

Other inorganic fine particles than fine silica particles described above may exist on the surface of the toner. Examples of the inorganic particles include titanium oxide particles, alumina particles, complex oxide particles thereof, and the like.

Production Method of Toner

The method for manufacturing the toner particle is not particularly limited, and any known method may be used. From the viewpoint that the toner obtains good flowability, the toner particle is preferably manufactured in an aqueous medium, for example, by a dispersion polymerization method, an association aggregation method, a dissolution suspension method, and a suspension polymerization method, and particularly s suspension polymerization methods is preferred.

The method for manufacturing a toner particle by a suspension polymerization method includes a step of dispersing a polymerizable monomer composition that comprises a polymerizable monomer capable of producing a binder resin and an optional additive such as a colorant in an aqueous medium and granulating particles, and a step of polymerizing the polymerizable monomer contained in the granulated particles to obtain a toner particle. Polymerizable monomers described above as materials for the binder resin may be used as the polymerizable monomer. The weight-average particle diameter (D4) of the toner is preferably 5.0 to 10.0 μm and more preferably 6.0 to 9.0 μm from the viewpoint of developing performance and fixing performance.

For example, when the toner particle is manufactured by a pulverization method, a binder resin and optional other additives such as a colorant and a release agent are thoroughly mixed with a mixer such as a Henschel mixer or ball mill. After that, the mixture is melt-kneaded using a heat kneader such as a heating roll, a kneader, and an extruder to disperse or dissolve toner materials, then the toner materials are subjected to cooling solidification, grinding, classification, and optionally surface treatment to obtain a toner particle. Either classification or surface treatment can be implemented first. The classification step is preferred to use a multi-grade classifier because of production efficiency.

The grinding may be conducted by a method using a known grinder such as a mechanical impact type grinder or a jet type grinder.

Examples of means for applying a mechanical impact force include methods using a mechanical impact type grinder such as Cryptron system manufactured by Kawasaki Heavy Industries, Ltd., or Turbo Mill manufactured by FREUND-TURBO Corporation. In addition, a method for applying a mechanical impact force to a toner particle by compressive force, frictional force, and the like, such as Mechano Fusion systems manufactured by Hosokawa Micron Corporation, Hybridization Systems manufactured by Nara Machinery Co., Ltd., and the like.

For example, a polymerizable monomer and a colorant (and further a polymerization initiator, a crosslinking agent, a charge control agent, and other additives according to need) are evenly dissolved or dispersed to obtain a polymerizable monomer composition in a suspension polymerization method. After that, this polymerizable monomer composition is dispersed in a continuous phase (for example, an aqueous phase) containing a dispersion stabilizer with an appropriate stirrer, and a polymerization reaction is simultaneously caused to obtain a toner particle with a desired particle diameter.

As the polymerizable monomer constituting the polymerizable monomer composition, known polymerizable monomers, in addition to the monomers as described above as examples of the vinylic monomer, may be used. Among them, using styrene or a styrene derivative singly or in a mixture with another polymerizable monomer is preferable in view of the developing characteristics and durability of the toner.

A preferable polymerization initiator used in a suspension polymerization method has a half-life during a polymerization reaction of 0.5 to 30.0 hours. In addition, the addition amount of the polymerization initiator is preferably 0.5 to 20.0 parts by mass based on 100 parts by mass of polymerizable monomers. Specific examples of preferable polymerization initiators include the polymerization initiators described above, azo type or diazo type polymerization initiators, peroxide type polymerization initiators, and the like.

The crosslinking agent described above may be added at a polymerization reaction in the suspension polymerization method. The addition amount thereof is preferably 0.1 to 10.0 parts by mass based on 100 parts by mass of polymerizable monomers.

Here, a preferable crosslinking agent is a compound mainly having two or more polymerizable double bonds. For example, as described above, aromatic divinyl compounds, carboxylic acid esters having two double bonds, divinyl compounds, and compounds having three or more vinyl groups are preferred. These may be used singly or in a combination of two or more of these.

Hereinafter, the manufacture of the toner particle by a suspension polymerization method is specifically described, but is not limited thereto. First, a polymerizable monomer composition, which has been obtained by adding, as appropriate, the polymerizable monomer described above, the colorant, and the like and uniformly dissolving or dispersing the contents using a homogenizer, a ball mill, an ultrasonic disperser, and the like, is suspended in an aqueous medium containing a dispersion stabilizer for granulation. At this time, it is better to use a disperser such as a high-speed stirrer or an ultrasonic disperser to achieve the desired toner particle size at once because the particle diameter of the resulting toner particles is sharp. As the timing of adding a polymerization initiator, the polymerization initiator may be added simultaneously with the addition of another additive to the polymerizable monomer or may be mixed just before suspending in an aqueous medium. In addition, a polymerization initiator dissolved in polymerizable monomers or a solvent may be added just after the granulation and before starting the polymerization reaction.

After the granulation, it is sufficient to stir using an ordinary stirrer to the extent that the particle state is maintained, and particle suspension and sedimentation are prevented.

Known surfactants, organic dispersing agents, or inorganic dispersing agents can be used as the dispersion stabilizer. Among them, inorganic dispersing agents are preferred because inorganic dispersing agents are less likely to produce harmful ultrafine particles, do not easily lose stability even when the reaction temperature is changed because the dispersion stability is provided due to the steric hindrance, and are easy to be washed. Examples of such an inorganic dispersing agent include phosphoric acid polyvalent metal salts such as tricalcium phosphate, magnesium phosphate, aluminum phosphate, zinc phosphate, and hydroxyapatite; carbonate salts such as calcium carbonate and magnesium carbonate; inorganic salts such as calcium metasilicate, calcium sulfate, and barium sulfate; and inorganic compounds such as calcium hydroxide, magnesium hydroxide, and aluminum hydroxide.

These inorganic dispersing agents are preferably used in an amount from 0.20 to 20.00 parts by mass based on 100 parts by mass of polymerizable monomers. The dispersion stabilizer may be used singly or in a combination of multiple species. Furthermore, a surfactant in an amount from 0.0001 to 0.1000 parts by mass, in relation to 100 parts by mass of polymerizable monomers, may be used in combination.

The polymerization temperature in the polymerization reaction of the above-mentioned polymerizable monomer is normally set to 40° C. or higher, preferably from 50° C. to 90° C. After the completion of the polymerization of the polymerizable monomer described above, the resultant polymer particle is filtrated, washed, and dried to obtain a toner particle.

In the drying step, the temperature at drying and the drying time may be determined while checking the moisture content of the toner particle. From the viewpoint of toner flowability, the moisture content in the toner is preferably 1.00 mass % or less, more preferably 0.40 mass % or less, still more preferably 0.30 mass % or less, and further preferably 0.20 mass % or less. The lower limit is not particularly limited, but the number proportion is preferably 0.01 mass % or more and more preferably 0.05 mass % or more.

Fine silica particles are externally added to and mixed with the resultant toner particle to be attached to the toner particle surface, thereby obtaining a toner. In addition, the classification step may be included in the production step (before mixing the fine silica particles) so as to remove coarse particles and fine particles included in the toner particle.

Externally Adding Step

Figure 3:
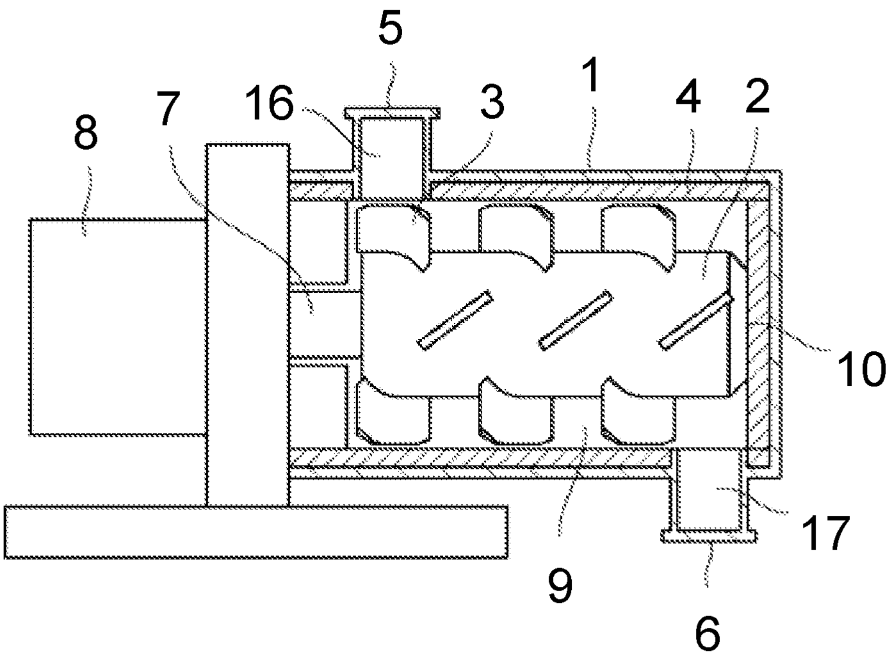
FIG. 3 is a schematic view illustrating an example of a mixing process apparatus.

A known mixing process apparatus may be used as a mixing process apparatus for externally adding and mixing fine silica particles, but an apparatus as illustrated in FIG. 3 is preferable in that the coefficient of variation of the particle diameters of the agglomerates can be easily controlled. FIG. 3 is a schematic view illustrating an example of a mixing process apparatus that can be used when fine silica particles are externally added and mixed.

The mixing process apparatus has a constitution in which share is applied to a toner particle and fine silica particles in a narrow clearance part. This allows the fine silica particles to adhere to the surface of the toner particle while aligning the size of the agglomerates of the fine silica particles. Accordingly, the coefficient of variation of the particle diameters of the agglomerates can be controlled to the above range more easily.

Furthermore, as described later, the coefficient of variation can be easily controlled in a preferable range because the toner particle and the fine silica particles easily circulate in the axis direction of the rotating member and are easily mixed uniformly enough before fixation proceeds.

Figure 4:
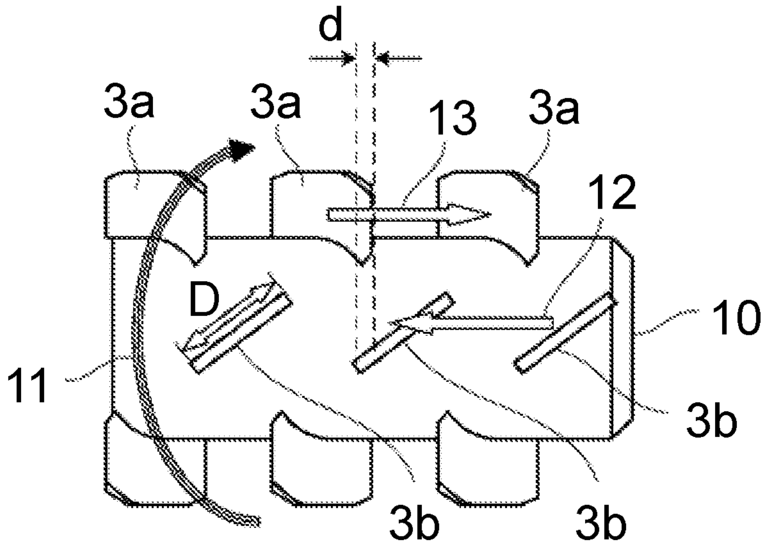
FIG. 4 is a schematic view illustrating an example of a constitution of a stirring member.

A mixing process apparatus (Henschel mixer and the like) may be used for mixing the toner particle and the fine silica particles. The apparatus illustrated in FIG. 3 is preferred in that the external addition state can be easily controlled. That is, an apparatus as illustrated in FIG. 3 has a constitution where the share is easily applied to the toner, and the coefficient of variation can be easily controlled in short time treatment. Meanwhile, FIG. 4 is a schematic view illustrating an example of a constitution of a stirring member used in the mixing process apparatus. Hereinafter, the externally adding and mixing step of the fine silica particles is described with reference to FIGS. 3 and 4.

The mixing process apparatus in which the fine silica particles are externally added and mixed has a rotating member 2 on which at least multiple stirring members 3 are disposed on the surface, a driver 8 that rotationally drives the rotating member (7 indicates a central axis), and a body casing 1 disposed with an interval with the stirring member 3.

The interval (clearance) between the inner periphery of the body casing 1 and the stirring member 3 is preferably kept constant and very small so as to apply the share to a toner particle evenly and align the size of the agglomerates of fine silica particles while making it easier for the agglomerates to adhere to the surface of the toner particle.

This apparatus has an inner peripheral diameter of the body casing 1 two or less times the outer peripheral diameter of the rotating member 2. FIG. 3 indicates an example wherein the inner peripheral diameter of the body casing 1 is 1.7 times the outer peripheral diameter of the rotating member 2 (the diameter of the body part excluding the stirring member 3 from the rotating member 2). When the inner peripheral diameter of the body casing 1 is two or less times the outer peripheral diameter of the rotating member 2, process spaces where force is applied to the toner particle are appropriately limited, and impact force is sufficiently applied to the fine silica particles that form secondary particles.

It is preferred to adjust the clearance according to the size of the body casing. Sufficient share can be applied to fine silica particles by setting the clearance to about from 1% to 5% of the inner peripheral diameter of the body casing 1. Specifically, when the inner peripheral diameter of the body casing 1 is about 130 mm, the clearance should be about 2 to 5 mm, and when the inner peripheral diameter of the body casing 1 is about 800 mm, the clearance should be about 10 to 30 mm.

In the externally adding and mixing step of fine silica particles, a mixing process apparatus is used, and a rotating member 2 is rotated by a driver 8, and a toner particle and fine silica particles put in the mixing process apparatus are stirred and mixed to externally add and mixed the fine silica particles on the surface of the toner particle.

As illustrated in FIG. 4, at least some of the multiple stirring members 3 are formed as feeding stirring members 3*a* that feed the toner particle and the fine silica particles in one axis direction of the rotating member in association with the rotation of the rotating member 2. In addition, at least some of the multiple stirring members 3 are formed as return stirring members 3*b* that return the toner particle and the fine silica particles in the other axis direction of the rotating member in association with the rotation of the rotating member 2.

Here, when a raw material feeding port 5 and a product discharge outlet 6 are disposed on both edges of the body casing 1, as illustrated in FIG. 3, the direction from the raw material feeding port 5 to the product discharge outlet 6 (rightward direction in FIG. 3) is referred to as the "feeding direction".

That is, as illustrated in FIG. 4, the plate surface of the feeding stirring member 3*a* tilts so as to feed the toner particle in the feeding direction (13). Meanwhile, the plate surface of the stirring member 3*b* tilts so as to feed the toner particle and the fine silica particles in the return direction (12).

This process performs the externally adding and mixing process of fine silica particles on the surface of the toner particles while repeatedly feeding in the "feeding direction 13" and the "return direction 12".

The stirring members 3*a* and 3*b* include a set of multiple members arranged in the circumferential direction of the rotating member 2 with intervals. The stirring members 3*a* and 3*b* include a set of two members on the rotating member 2 at intervals of 180° apart from each other in an example illustrated in FIG. 4. However, multiple members may be disposed as one set, like a set of four members disposed at intervals of 120° or 90°.

In the example illustrated in FIG. 4, twelve stirring members 3*a* and 3*b* total are formed at even intervals.

Furthermore, in FIG. 4, D denotes the width of the stirring member, and d denotes an interval indicating the overlapping part of the stirring members. D is preferably a width at a degree from 20% to 30% in relation to the length of the rotating member 2 in FIG. 4 from the viewpoint of efficiently feeding the toner particle and the fine silica particles in the feeding direction and the return direction. FIG. 4 indicates an example where D is 23%. When an extension line is drawn in the perpendicular direction from the edge position of the stirring member 3*a*, the stirring members 3*a* and 3*b* preferably have a certain degree of overlapping part d between the stirring members 3*a* and 3*b*. This makes it possible to efficiently apply share to the fine silica particles, which are secondary particles. For applying share, d in relation to D is preferably from 10% to 30%.

In addition to the shape as illustrated in FIG. 4, any shapes of blades having a constitution that can feed the toner particle in the feeding and return directions and maintain the clearance are also acceptable. Specifically, a shape with a curved surface and a paddle structure in which the blade tip is joined to the rotating member 2 via a rod-shaped arm are also acceptable.

Hereinafter, the details will be described according to the schematic views of the apparatus indicated in FIGS. 3 and 4. The apparatus illustrated in FIG. 3 has a rotating member 2 on which at least multiple stirring members 3 are disposed on the surface, a driver 8 that rotationally drives the rotating member 2, and a body casing 1 disposed with an interval with the stirring member 3. The apparatus further has a jacket 4, which is disposed inside the body casing 1 and at the rotating member edge side surface 10 and through which a cooling and heating medium can flow.

Furthermore, the apparatus illustrated in FIG. 3 has a raw material feeding port 5 formed on the upper part of the body casing 1 in order to introduce the toner particle and the fine silica particles. Furthermore, the apparatus has a product discharge outlet 6 formed at the lower part of the body casing 1 in order to discharge the toner, which has been subjected to the externally adding and mixing process, to the outside of the body casing 1.

Furthermore, the apparatus illustrated in FIG. 3 has an inner piece 16 for raw material feeding ports inserted into the raw material feeding port 5, and an inner piece 17 for product discharge outlets inserted into the product discharge outlet 6.

First, the inner piece 16 for raw material feeding ports is taken out of the raw material feeding port 5, and the toner particle is fed to the process space 9 from the raw material feeding port 5. Next, fine silica particles are inputted into the process space 9 from the raw material feeding port 5, and raw material feeding port inner piece 16 is inserted. Next, the rotating member 2 is rotated by the driver 8 (11 denotes a rotation direction), and the treating object fed as above is subjected to an externally adding and mixing process while stirring and mixing by multiple stirring members 3 disposed on the surface of the rotating member 2.

It should be noted that the externally adding and mixing process is preferably divided into multiple conditions in order to control the size and the coefficient of variation, which indicates homogeneity, of the agglomerates of fine silica particles. Specifically, the externally adding and mixing process is performed at a condition where fine silica particles are not fixed to the toner particle as a purpose for deagglomerating fine silica particles, and the externally adding and mixing process is then performed at a condition where deagglomerated fine silica particles are fixed to the toner particle. In the first externally adding and mixing process, deagglomerated fine silica particles are further deagglomerated when the process condition is too strong, and the ratio of the primary particles of the fine silica particles attached to the toner particle surface tends to increase.

More specifically, it is preferred to control the power of the driver 8 to from 0.2 to 0.3 W/g as the condition of the first externally adding and mixing process and the power of the driver 8 to from 0.2 to 0.5 W/g as the condition of the second externally adding and mixing process.

When the power in the first process is 0.2 W/g or more, the agglomerates of the fine silica particles can be suitably deagglomerated, and the coefficient of variation tends to be easily controlled to be low. When the power in the first process is 0.3 W/g or less, the embedment of the fine silica particles to the toner particle surface can be suppressed while advancing the deagglomeration of the agglomerates of the fine silica particles sufficiently, and the coefficient of variation tends to be easily controlled to be low.

When the power in the second process is 0.2 W/g or more, the fine silica particles easily attach to the toner particle surface, and good charging performance and flowability can be easily obtained. When the power in the second process is 0.5 W/g or less, the fine silica particles are moderately deagglomerated, and the agglomerates of the fine silica particles are easily attached to the toner particle surface.

Preferable process time in the first-time externally adding and mixing process is from 1 to 10 minutes. Within the above range, the fine silica particles are well deagglomerated. Preferable treating time in the second-time externally adding and mixing process is from 4 to 20 minutes. The agglomerates of fine silica particles are allowed to sufficiently adhere to the toner particle surface by satisfying the above range.

After the end of the externally adding and mixing process, the inner piece 17 for product discharge outlets in the product discharge outlet 6 is taken out, and the rotating member 2 is rotated by the driver 8, and the toner is discharged from the product discharge outlet 6. Optionally, coarse grains and the like are separated from the resultant toner with a sieve machine such as a circular vibration sieve machine to obtain a toner.

Image Forming Apparatus

Figure 6:
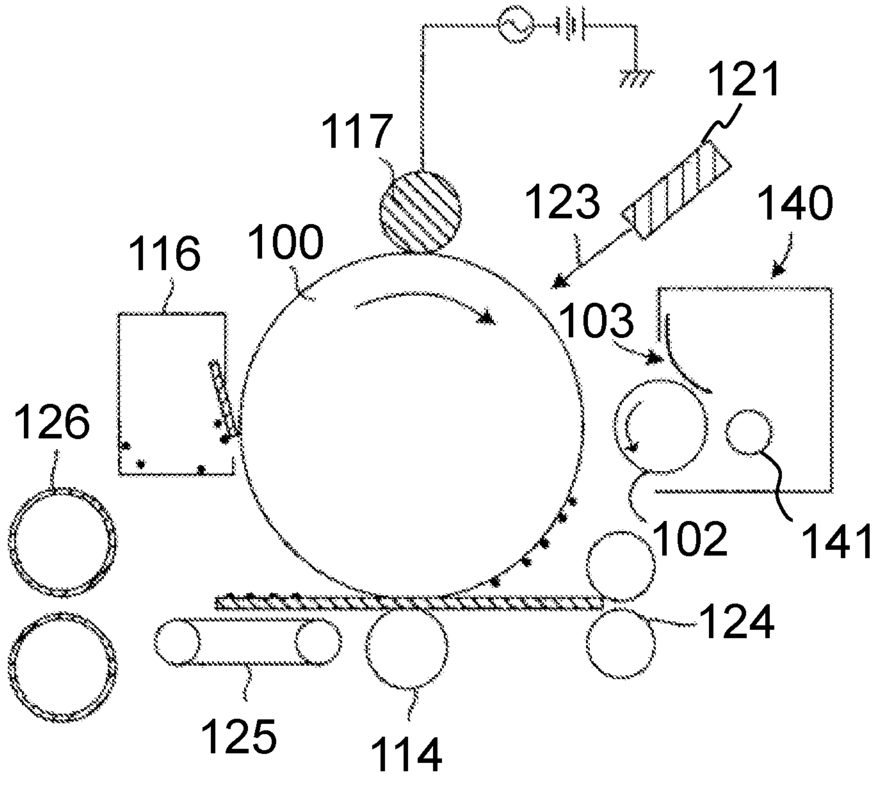
FIG. 6 is a view illustrating an example of an image forming apparatus.

Next, an example of an image forming apparatus that can use the toner suitably is described along FIG. 6. In FIG. 6, 100 denotes a photosensitive drum, and around the photosensitive drum, a primary charging roller 117, a developing sleeve 102, a developing device 140 having a developing blade 103 and a stirring member 141, a transfer charging roller 114, a cleaner 116, a register roller 124, and the like are disposed. The photosensitive drum 100 is charged, for example, to −600 V by a primary charging roller 117 (the applied voltage is, for example, AC voltage: 1.85 kVpp, DC voltage: −620 Vdc). Then the photoreceptor 100 is irradiated with a laser beam 123 from a laser generator 121 for exposing, and thereby an electrostatic latent image corresponding to a target image is formed. The electrostatic latent image on the photosensitive drum 100 is developed with a mono-component toner by a developing device 140 to form a toner image. The toner image is transferred on a transfer material by a transfer roller 114 in contact with a photoreceptor via a transfer material. A transfer material carrying the toner image is transported to a fixing unit 126 by a transfer belt 125 and the like and fixed on the transfer material. The toner partly remained on the photoreceptor is cleaned by a cleaner 116.

It should be noted that an image forming apparatus of a magnetic mono-component jumping development system is described here, but the image forming apparatus may be used for either jumping development or contact development.

Method for Measuring Weight-Average Particle Diameter (Dv) of Toner

The weight-average particle diameter (Dv) of the toner is calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis.

On the "Standard Operating Method (SOM) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 μm. The specific measurement method is as follows.

1. 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.
2. Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.
3. An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 180° is prepared. Approximately 3.3 L of ion exchanged water is placed in a water bath in the ultrasonic dispersion system, and approximately 2 mL of Contaminon N is added to this water bath.
4. The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.
5. While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.
6. The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.
7. The weight-average particle diameter (Dv) is calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (Dv).

Calculation Method of A and A/B by $^{29}$Si-Solid-State NMR Measurement of Fine Silica Particles The parameters A, B, and A/B are calculated by a $^{29}$Si-solid-state NMR measurement using fine silica particles separated from the toner surface. Hereinafter, the separation method of fine silica particles from the toner surface and a $^{29}$Si-solid-state NMR measurement method are described.

Separation Method of Fine Silica Particles from Toner Surface

When fine silica particles separated from the toner surface are used as a measurement sample, the separation of fine silica particles from toner is conducted according to the following procedure.

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube to prepare a dispersion liquid. To this dispersion liquid, 1 g of toner is added, and toner lumps are loosened with a spatula or the like.

The centrifuge tube is set in "KM Shaker" (model: V. SX, manufactured by Iwaki Sangyo Co., Ltd.) and shaken for 20 min under the condition of 350 reciprocations per min. After shaking, the solution is transferred to a glass tube (50 mL) for a swing rotor, and centrifugation is performed under the conditions of 3500 rpm and 30 min with a centrifuge.

Toner exists in the uppermost layer in a glass tube after centrifugation, and fine silica particles exist in the aqueous solution side in the lower layer. The aqueous solution in the lower layer is sampled, the centrifugation is repeatedly conducted according to need, the separation is thoroughly conducted, then a dispersion is dried, and fine silica particles are sampled.

Next, a $^{29}$Si-solid-state NMR measurement of the fine silica particles recovered from the toner is conducted in the following measurement condition.

| Measurement Condition of $^{29}$Si-solid-state NMR |
| --- |
| Apparatus: AVANCE III 500, manufactured by BRUKER<br>Probe: 4 mm MAS BB/1H<br>Measurement temperature: room temperature<br>Sample rotation number: 6 kHz<br>Sample: fine silica particles, 150 mg |

-continued

| Measurement Condition of $^{29}$Si-solid-state NMR |
| --- |
| Measurement nucleus frequency: 99.36 MHz<br>Standard substance: DSS (external standard: 1.534 ppm)<br>Observed width: 29.76 kHz<br>Measurement method: DD/MAS, CP/MAS<br>90° pulse width: 4.00 μs, −1 dB<br>Contact time: 1.75 to 10 ms<br>Repeating time: 30 s (DD/MASS), 10 s (CP/MAS)<br>Cumulative number: 2048<br>LB value: 50 Hz |

After the measurement, multiple silane components having different substituents and bonding groups are peak-separated into the following M unit, D unit, T unit, and Q unit by curve fitting.

| | |
| --- | --- |
| M unit structure: $(Ri)(Rj)(Rk)SiO_{1/2}$ | Formula (4) |
| D unit structure: $(Rg)(Rh)Si(O_{1/2})_2$ | Formula (5) |
| T unit structure: $RmSi(O_{1/2})_3$ | Formula (6) |
| Q unit structure: $Si(O_{1/2})_4$ | Formula (7) |

The Ri, Rj, Rk, Rg, Rh, and Rm in Formulas (4), (5), and (6) represent alkyl groups such as hydrocarbon groups with 1 to 6 carbons, halogen atoms, hydroxy groups, acetoxy groups, carbinol groups, epoxy groups, carboxy groups, hydrogen atoms, or alkoxy groups bonded to silicon.

After the peak separation, the values of parameters A, B, and A/B are calculated, assuming that an integrated value of the D unit, determined when an integrated value of the Q unit in a CP/MAS measurement is set to 100, is taken as A, and an integrated value of the D unit, determined when the integrated value of the Q unit in a DD/MAS measurement is set to 100, is taken as B. Here, a measurement method of the parameters A, B, and A/B of fine silica particles contained in the toner is described, but the raw material of the fine silica particles may be measured.

Judgment Whether Fine Silica Particles are Surface-Treated with Silicone Oil

As an analysis method for confirming that fine silica particles are surface-treated with silicone oil, a heat decomposition device (Japan Analytical Industry Co., Ltd., JPS-330) is used. An MS spectrum derived from silicone oil can be obtained when a 0.1-mg sample is heated from 20° C. up to 500° C. For comparison, silicone oil is measured similarly to obtain an MS spectrum. Both spectra are compared, and if a matched percentage of the MS spectrum derived from silicone oil is high, the fine silica particles can be judged as surface-treated with silicone oil.

Calculation of Number-Average Particle Diameter Rb of Agglomerate of Fine Silica Particles, Number-Average Particle Diameter Ra of Primary Particles, Rb/Ra, and Coefficient of Variation The values of physical properties such as the number-average particle diameter Rb of the agglomerate of fine silica particles, the number-average particle diameter Ra of the primary particles, Rb/Ra, and the coefficient of variation are measured for a sampled fine silica particles attached on the toner particle surface. When multiple fine silica particles are included, fine silica particles, the particle diameter of primary particles of which is 50 nm or less, are analyzed as targets among all fine silica particles attached to the toner particle surface.

Sampling Fine Silica Particles from Toner (1) Sampling Fine Silica Particle Sample Put 0.1 g of toner, 20 ml of ion-exchanged water, and 0.1 ml of Contaminon N (10 mass % aqueous solution of a pH-7 neutral detergent for washing precision measuring instruments, containing a nonionic surfactant, an anionic surfactant, and an organic builder, manufactured by Wako Pure Chemical Industries, Ltd.) in a 30-ml glass vial.

Set the tip of an ultrasonic vibrator UH-50 (manufactured by SMT Co., Ltd., titanium alloy chip with a tip diameter of φ6 mm is used) to be positioned at the central part of the vial and at the height of 5 mm from the bottom surface of the vial, and separate the fine silica particles from the toner particle surface by ultrasonic dispersion. It should be noted that the output of the ultrasonic dispersion is set to 30 W so that the shape of the agglomerates of fine silica particles on the toner particle surface should not be changed. After sonication for 10 minutes, allow the vial to stand for 30 minutes, sample the supernatant liquid, and drop the supernatant liquid onto a glass slide. After that, dry the vial overnight. At this time, do not apply heat as much as possible, and vacuum-dry the vial at 30° C. or lower to obtain a fine silica particle sample for measurement.

Measurement of Fine Silica Particle Sample (2) SEM Observation

The fine silica particle sample is measured using an image obtained by observing a backscattered electron image of a field emission scanning electron microscope S-4800 (Hitachi High-Technologies Corporation). Since the backscattered electron image is easier to obtain a high-contrast fine silica particle image than a secondary electron image, the measurement of a fine silica particle sample can be conducted with high accuracy. The observation conditions are listed as follows.

| |
| --- |
| Acceleration voltage: 0.8 kV<br>Emission current: 20 μA<br>Detector: [SE upper (U)], [+BSE (L. A. 100)]<br>Probe current: [Normal]<br>Focus mode: [UHR]<br>WD: [3.0 mm] |

(3) Focus Adjustment

Drag in the magnification display section of the control panel and set the magnification to 100000 (100 k) times. Rotate the focus knob [COARSE] on the operation panel and adjust the aperture alignment when the image is in focus to some extent. Click [Align] on the control panel to display the alignment dialog box and select [Beam]. Rotate the STIGMA/ALIGNMENT knob (X, Y) on the operation panel to move the displayed beam to the center of the concentric circles. Next, select [Aperture], and then turn the STIGMA/ALIGNMENT knob (X, Y) one by one to stop or minimize the movement of the image. Close the Aperture dialog box and use the auto focus to bring the image into focus. Repeat this operation twice more to bring the image into focus.

Figure 5:
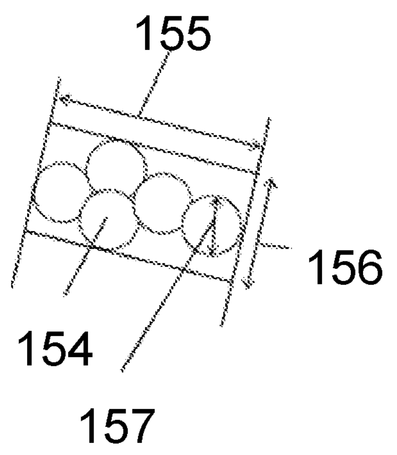
FIG. 5 is a schematic view relating to the measurement of fine silica particles.

FIG. 5 is an example of a schematic view of observed fine silica particles. 154 denotes an agglomerate of fine silica particles, 155 denotes a maximum Feret diameter, and 156 denotes a minimum Feret diameter. 157 denotes the particle diameter of a primary particle of a fine silica particle. After that, measure at least 300 fine silica particles. Select the number-average particle diameter of the maximum Feret diameter as the number-average particle diameter Rb of agglomerates of the fine silica particles. Select the number-average particle diameter of the primary particles as the number-average particle diameter Ra of primary particles of fine silica particles. Rb/Ra can be obtained using the Rb and Ra as calculated above.

The coefficient of variation (standard deviation/arithmetical mean) calculated using all data of Rbs is taken as the coefficient of variation of the particle diameters based on the number of agglomerates of fine silica particles. Furthermore, the number of agglomerates (number proportion of agglomerates) in relation to the sum of the number of agglomerates and the number of non-agglomerate forms can be obtained from the number of agglomerates in relation to the sum of the number of agglomerates and the number of fine silica particles present as primary particles.

It should be noted that agglomerates are judged to be formed when the observed fine silica particles are not present as primary particles in the SEM observation described above.

Measurement on Moisture Content in Toner

The moisture content in a toner is measured using a moisture meter (mark3 HP moisture analyzer, manufactured by Sartorius AG). Specifically, the moisture content can be obtained by weighing 10 g of toner in an aluminum pan and heating the moisture meter at 120° C.

EXAMPLES

The present invention will be described in more detail hereinbelow with reference to Examples and Comparative Examples, but the present invention is not limited thereto. Unless otherwise specified, the parts used in the examples are based on mass.

Production Example of Fine Silica Particles 1

Fumed silica (base material silica; spherical shape, BET specific surface area: 300 $m^2/g$), 100 parts, was put in a reaction container, then a solution containing 25 parts of polydimethylsiloxane (kinematic viscosity at 25° C.: 50 $mm^2/s$), in which $R^1$ and $R^2$ are hydroxy groups in the formula (B), and the side chain is unsubstituted, diluted with 100 parts of hexane was added under stirring under nitrogen purge, and a reaction process was first conducted at 300° C. for 120 minutes while stirring was continued. After that, the resultant fine silica particles are deagglomerated using a pin-type deagglomerator to obtain fine silica particles 1. The number-average particle diameter of primary particles of the resultant fine silica particles 1 was 7 nm.

The physical properties of the fine silica particles 1 are listed in Tables 1-1 and 1-2.

TABLE 1-1

| | | Treating agent 1 | | | | Treating agent 2 | | | |
|---|---|---|---|---|---|---|---|---|---|
| Silica fine particles | Number-average particle diameter Ra of primary particles (nm) | $R^1$ | $R^2$ | Kinematic viscosity at 25° C. ($mm^2/s$) | Parts | R1 | R2 | Kinematic viscosity at 25° C. ($mm^2/s$) | Parts |
| Silica fine particles 1 | 7 | hydroxy group | hydroxy group | 50 | 25 | | | | |
| Silica fine particles 2 | 7 | carbinol group | carbinol group | 50 | 25 | | | | |
| Silica fine particles 3 | 7 | epoxy group | epoxy group | 50 | 25 | | | | |
| Silica fine particles 4 | 7 | carboxy group | carboxy group | 50 | 25 | | | | |
| Silica fine particles 5 | 7 | carboxy group | carboxy group | 50 | 20 | methyl group | methyl group | 50 | 10 |
| Silica fine particles 6 | 7 | hydroxy group | hydroxy group | 50 | 15 | | | | |
| Silica fine particles 7 | 7 | hydroxy group | hydroxy group | 50 | 13 | | | | |
| Silica fine particles 8 | 5 | hydroxy group | hydroxy group | 50 | 30 | | | | |
| Silica fine particles 9 | 30 | hydroxy group | hydroxy group | 50 | 10 | | | | |
| Silica fine particles 10 | 5 | hydroxy group | hydroxy group | 50 | 5 | methyl group | methyl group | 50 | 20 |
| Silica fine particles 11 | 5 | hydroxy group | hydroxy group | 25 | 30 | | | | |
| Silica fine particles 12 | 33 | hydroxy group | hydroxy group | 50 | 10 | | | | |
| Silica fine particles 13 | 5 | methyl group | methyl group | 50 | 25 | | | | |
| Silica fine particles 14 | 5 | hydroxy group | hydroxy group | 25 | 35 | | | | |
| Silica fine particles 15 | 9 | Described in the body text | | | | methyl group | methyl group | 100 | 10 |
| Silica fine particles 16 | 50 | Described in the body text | | | | | | | |
| Silica fine particles 17 | 14 | Described in the body text | | | | | | | |

TABLE 1-2

| | Analysis | |
|---|---|---|
| Silica fine particles | A | A/B |
| Silica fine particles 1 | 158 | 4.0 |
| Silica fine particles 2 | 158 | 4.0 |
| Silica fine particles 3 | 158 | 4.0 |

TABLE 1-2-continued

| Silica fine particles | Analysis A | A/B |
|---|---|---|
| Silica fine particles 4 | 158 | 4.0 |
| Silica fine particles 5 | 150 | 3.0 |
| Silica fine particles 6 | 140 | 6.0 |
| Silica fine particles 7 | 173 | 6.4 |
| Silica fine particles 8 | 173 | 6.4 |
| Silica fine particles 9 | 173 | 6.4 |
| Silica fine particles 10 | 120 | 6.0 |
| Silica fine particles 11 | 300 | 6.9 |
| Silica fine particles 12 | 158 | 6.6 |
| Silica fine particles 13 | 108 | 5.4 |
| Silica fine particles 14 | 350 | 7.4 |
| Silica fine particles 15 | 98 | 3.5 |
| Silica fine particles 16 | 25 | 2.2 |
| Silica fine particles 17 | 170 | 4.2 |

Production Example of Fine Silica Particles 2 to 14

Fine silica particles 2 to 14 were produced in the same manner as the production method of fine silica particles 1, except that the treatment condition 1 (the types of $R^1$ and $R^2$ in the polydimethylsiloxane and the addition amount of the polydimethylsiloxane) and the treatment condition 2 (the type and addition amount of polydimethylsiloxane) in the production example of fine silica particles 1 were changed as indicated in Table 1-1. The physical properties of the fine silica particles 2 to 14 are listed in Table 1-2. Here, the treatment condition 2 indicates a condition for conducting, subsequent to the treatment condition 1, a treatment wherein polydimethylsiloxane, in which $R^1$ and $R^2$ are methyl groups in the polydimethylsiloxane of formula (B), that is, the polydimethylsiloxane of formula (A), was used and the addition amount of polydimethylsiloxane was changed.

Production Example of Fine Silica Particles 15

Untreated dry silica (average primary particle diameter=9 nm) was put in an autoclave provided with a stirrer and heated at 200° C. in a fluidized state under stirring. The inside of the reactor was replaced with nitrogen gas, the reactor was sealed, and 25 parts of hexamethyldisilazane was sprayed inside for every 100 parts of dry silica to conduct silane compound treatment in a fluidized state of silica. The reaction was continued for 60 minutes and then terminated. After the reaction was completed, the autoclave was depressurized and washed with a stream of nitrogen gas to remove excess hexamethyldisilazane and byproducts from the hydrophobic silica.

Furthermore, while stirring the inside of the reaction tank, 10 parts of dimethyl silicone oil (viscosity=100 $mm^2/s$) was sprayed to 100 parts of dry silica, and stirring was continued for 30 minutes. After that, the temperature was raised to 300° C. while stirring. The mixture was stirred for another 2 hours before being taken out and subjected to a deagglomeration process to obtain fine silica particles 15. The physical properties of the fine silica particles 15 are listed in Table 1-2.

Production Example of Fine Silica Particles 16

Oxygen gas was supplied to the burner, the ignition burner was ignited, then hydrogen gas was supplied to the burner to form a flame, and raw material silicon tetrachloride was fed thereto to gasify to obtain fine silica particles. The disclosures in Japanese Patent Application Publication No. 2002-003213 and Japanese Patent No. 6478664 are referred to as specific methods for production.

Specifically, oxygen gas was supplied to the burner by opening the combustion-supporting gas supply pipe, the ignition burner was ignited, and hydrogen gas was supplied to the burner by opening the combustible gas supply pipe to form a flame. Silicon tetrachloride was gasified in an evaporator and supplied thereto to undergo a flame hydrolysis reaction, and the fine silica powder produced was collected by a bag filter in the collection device to produce fine silica particles. The specific blowing conditions for each gas were as follows: the blowing rate of silicon tetrachloride: 200 kg/hr, the blowing rate of the hydrogen gas: 60 $Nm^3/hr$, and the blowing rate of the oxygen gas: 60 $Nm^3/hr$. The resultant fine silica particles showed a number-average particle diameter of primary particles of 30 nm and a BET specific surface area of 50 $m^2/g$.

To 100 parts of the resultant fine silica particles, 10 parts of hexamethyldisilazane was added as a surface treatment agent for hydrophobic treatment to obtain fine silica particles 16. The obtained physical properties of the fine silica particles 16 are listed in Table 1-2.

Production Example of Fine Silica Particles 17

Fumed silica (the number-average particle diameter of primary particles of base material silica was 14 nm), 100 parts, was put in a reaction container, then a solution containing 20 parts of methylhydrogenpolysiloxane (kinematic viscosity at 25° C.: 20 $mm^2/s$) diluted with 100 parts of hexane was added with stirring under a nitrogen purge, and treatment was conducted while stirring was continued. After that, the resultant fine silica particles are deagglomerated using a pin-type deagglomerator to obtain fine silica particles 17. The number-average particle diameter of primary particles of the resultant fine silica particle 17 was 14 nm. The physical properties of the fine silica particles 17 are listed in Table 1-2.

Production Example of Magnetic Body

Magnetic Body 1

In an aqueous ferrous sulfate solution, a caustic soda solution of 1.00 to 1.10 equivalents to the iron element, $P_2O_5$ in an amount equivalent to 0.12 mass % to the iron element in terms of the phosphorus element, and $SiO_2$ in an amount equivalent to 0.60 mass % to the iron element in terms of the silicon element was mixed to prepare an aqueous solution containing ferrous hydroxide. The oxidation reaction was carried out at 85° C. under the pH of the aqueous solution of 8.0 while blowing air to prepare a slurry solution containing seed crystals.

Next, a ferrous sulfate solution was added to this slurry so as to be from 0.90 to 1.20 equivalents in relation to the initial amount of alkali (sodium components in caustic soda), then the slurry solution was maintained at pH 7.6 to promote an oxidation reaction while blowing air into the slurry to obtain a slurry containing magnetic iron oxide. After filtration and washing, this water-containing slurry was once taken out. At this time, a small amount of the water-containing sample was sampled, and the water content was measured.

Next, this water-containing sample was put into another aqueous medium without drying and redispersed in a pin mill while stirring and circulating the slurry, and the pH of the redispersed solution was adjusted to about 4.8. Then, 1.7 parts (the amount of magnetic iron oxide was calculated as the value obtained by subtracting the water content from the water-containing sample) of n-hexyltrimethoxysilane coupling agent in relation to 100 parts of magnetic iron oxide was added while stirring to be hydrolyzed. After that, surface treatment was conducted by thoroughly stirring the dispersion while the pH of the dispersion was adjusted to 8.6. The produced hydrophobic magnetic material was filtered through a filter press, washed with a large amount of water, and dried at 100° C. for 15 minutes, then at 90° C. for 30 minutes. The resultant particles were then deagglomerated to obtain a magnetic body 1 with a volume-average particle diameter of 0.23

Production Example of Amorphous Polyester Resin 1

The molar ratio of polyester monomers is set as follows. BPA-PO/BPA-EO/TPA/TMA=50/50/70/12

Here, the abbreviations means the followings: BPA-PO: bisphenol A propylene oxide 2.2 mol adduct; BPA-EO: bisphenol A ethylene oxide 2.2 mol adduct; TPA: telephtalic acid; and TMA: trimellitic anhydride.

A raw material monomer other than TMA among the raw material monomer as listed above and 0.1 mass % of tetrabutyl titanate as a catalyst were put in a flask provided with a dehydration pipe, a stirring blade, a nitrogen introduction pipe, and the like, and condensation polymerization was conducted at 220° C. for 10 hours. After that, TMA was further added, and the reaction was continued at 210° C. until the acid value reached the desired value to obtain an amorphous polyester resin 1 (the glass transition temperature Tg was 64° C., the acid value was 17 mgKOH/g, and the peak molecule weight was 6300).

Production Example 1 of Toner Particle

To 720 parts of ion-exchanged water, 450 parts of 0.1 M aqueous $Na_3PO_4$ solution was fed, and the mixture was heated at 60° C. After that, 67.7 parts of 1.0 M aqueous $CaCl_2$) solution was added thereto to obtain an aqueous medium containing a dispersion stabilizer.

| |
|---|
| Styrene: 78.0 parts |
| n-Butyl acrylate: 22.0 parts |
| Divinyl benzene: 0.6 parts |
| Iron complex of monoazo dye (T-77: Hodogaya Chemical Co., Ltd.): 2.0 parts |
| Magnetic body 1: 90.0 parts |
| Amorphous polyester resin 1: 3.0 parts |

The above formulation was evenly dispersed and mixed using an attritor (Mitsui Miike Kakoki Kk) to obtain a polymerizable monomer composition. The resultant polymerizable monomer composition was warmed at 60° C., and 15.0 parts of Fischer-Tropsch wax (melting point: 74° C., number average molecular weight Mn: 500) was added and mixed. After the wax was dissolved, 7.0 parts of dilauryl peroxide as a polymerization initiator was dissolved to obtain a toner composition.

The toner composition was put in the aqueous medium and stirred at 60° C. for 12 minutes under an N2 atmosphere using a TK-type homomixer (Tokusyuki Kakogyou KK) at 12500 rpm for granulation. After that, the reaction was continued at 74° C. for 6 hours while stirring with a paddle stirring blade.

After the reaction was completed, the suspension was cooled, hydrochloric acid was added thereto, and the suspension was washed and filtrated. Furthermore, the filtrated matter was dried at 40° C. for 66 hours to obtain a toner particle 1. The weight-average particle diameter Dv of the obtained toner particle 1 was 7.2 μm. The moisture content in the toner particle 1 was 0.15 mass %.

Production Example of Toner Particle 2

The toner particle 2 was obtained in the same manner as in the production example of the toner particle 1, except that the drying condition was changed to a condition at 40° C. for 40 hours. The weight-average particle diameter Dv of the resultant toner particle 2 was 7.2 μm. The moisture content in the toner particle 2 was 0.40 mass %.

Production Example of Toner Particle 3

The toner particle 3 was obtained in the same manner as in the production example of the toner particle 1, except that the drying condition was changed to a condition at 40° C. for 30 hours. The weight-average particle diameter Dv of the resultant toner particle 3 was 7.2 μm. The moisture content in the toner particle 3 was 0.50 mass %.

Production Example 1 of Toner

The toner particle 1 obtained in the production example 1 of the toner particle was subjected to an externally adding and mixing process using an apparatus illustrated in FIG. 3.

In this embodiment, the apparatus shown in FIG. 3, in which the inner peripheral diameter of the body casing 1 was 130 mm and the capacity of the process space 9 was $2.0\times10^{-3}$ $m^3$ was used, and the rated power of the driver 8 was set to 5.5 kW, and the stirring member 3 having the shape as shown in FIG. 4 was used. The overlapping width d between the stirring member 3*a* and the stirring member 3*b* in FIG. 4 was set to 0.25 D in relation to the maximum width D of the stirring member 3, and the clearance between the stirring member 3 and the inner periphery of the body casing 1 was set to 3.0 mm.

With the above apparatus constitution, 100 parts of the toner particle 1 and 0.40 parts of the fine silica particles 1 were put in the apparatus illustrated in FIG. 3. After the toner particles and fine silica particles were fed, pre-mixing was conducted to uniformly mix the toner particle and the fine silica particles. The pre-mixing conditions were set at 0.25 W/g of the power in the driver 8 and a processing time of 3 minutes.

After the end of pre-mixing, the externally adding and mixing process was conducted. For the externally adding and mixing process conditions, the peripheral velocity of the outermost end of the stirring member 3 was adjusted such that the power in the driver 8 was constant at 0.40 W/g, and the processing time was set to 5 minutes.

After the externally adding and mixing process, coarse grains and the like are removed with a circular vibration sieve machine in which a screen with a diameter of 500 mm and an aperture of 75 μm to obtain a toner 1. Analysis of the toner 1 revealed that the parameter A was 158, Rb was 25 nm, and the coefficient of variation was 2.25. The moisture in the toner 1 was 0.15 mass %. The condition of external addition and physical properties of the toner 1 are listed in Tables 2-1 and 2-2.

Production Examples 2 to 17 of Toners and Production Examples 2 to 4 and 8 of Comparative Toners Toners 2 to 17 and comparative toners 2 to 4 and 8 were obtained by changing the toner particle, the fine silica particles, and external addition condition in the production example of the toner 1, as listed in Table 3. The physical properties of the resultant toners are listed in Table 2-2.

Production Example 1 of Comparative Toner

To 100 parts of toner particle 3, 0.5 parts of fine silica particles 8 were dry-mixed for 10 minutes at a condition of 3400 rpm with FM 10C (manufactured by Nippon Coke & Engineering Co., ltd.) to obtain comparative toner 1. The physical properties of the obtained comparative toner 1 are indicated in Table 2-2.

Production Example of Comparative Toner 5

The toner particle 3 was subjected to an externally adding and mixing process using an apparatus illustrated in FIG. 3.

Specifically, 100 parts of the toner particle 3 and 0.40 parts of fine silica particles 15 were put in the apparatus illustrated in FIG. 3. Subsequently, pre-mixing was conducted. The pre-mixing conditions were set at 0.10 W/g of the power in the driver 8 and a processing time of 1 minute. After the end of pre-mixing, the externally adding and mixing process was conducted. The externally adding and mixing process conditions were adjusted such that the power in the driver 8 was 0.60 W/g, and the processing time was set to 3 minutes.

After that, 0.10 parts (0.50 parts in total in relation to 100 parts of the toner particle) of fine silica particles 15 were further added, the power of the driver 8 was adjusted to be constant at 0.60 W/g, and the process was conducted for another two minutes. After the externally adding and mixing process, coarse grains and the like are removed with a circular vibration sieve machine in which a screen with a diameter of 500 mm and an aperture of 75 μm to obtain a comparative toner 5. The physical properties of the comparative toner 5 are listed in Table 2-2.

Production Example of Comparative Toner 6

To 100 parts of toner particle 3, 0.5 parts of fine silica particles 16 and 1.0 part of hydrophobic silica particles RY 300 (manufactured by Nippon Aerosil Co., Ltd., fine silica particles with a number-average particle diameter of primary particles treated with dimethylsilicone oil of 8 nm) were dry-mixed for 10 minutes at a condition of 3400 rpm with FM 10C (manufactured by Nippon Coke & Engineering Co., ltd.) to obtain comparative toner 6. The physical properties of the obtained comparative toner 6 are indicated in Table 2-2.

Production Example of Comparative Toner 7

To 100 parts of toner particles 3, 2.0 parts of fine silica particles 17 and 1.0 part of NX90 (manufactured by Nippon Aerosil Co., Ltd., number-average particle diameter of primary particles: 12 nm; the treatment agent was hexamethyldisilazane) was added. The process was conducted in an externally adding process apparatus, FM 20C (Nippon Coke & Engineering Co., Ltd.), with a capacity of 20 liters, under a temperature of 30° C. in a condition where the peripheral speed of the stirring blade was set to 50 msec and the processing time was set to 10 minutes. After the process, coarse particles were removed using a sieve with a 45-um aperture to obtain comparative toner 7.

The physical properties of the resultant comparative toner 7 are listed in Tables 2-1 and 2-2.

TABLE 2-1

| | | | Pre-mixing | | External addition and mixing | |
|---|---|---|---|---|---|---|
| Toner No. | Toner particle | Silica particles | Power (W/g) | Processing time (min) | Power (W/g) | Processing time (min) |
| 1 | Toner particle 1 | Silica particles 1 | 0.25 | 3 | 0.40 | 5 |
| 2 | Toner particle 1 | Silica particles 1 | 0.25 | 5 | 0.40 | 5 |
| 3 | Toner particle 1 | Silica particles 2 | 0.25 | 3 | 0.40 | 5 |
| 4 | Toner particle 1 | Silica particles 3 | 0.25 | 3 | 0.40 | 5 |
| 5 | Toner particle 1 | Silica particles 4 | 0.25 | 3 | 0.40 | 5 |
| 6 | Toner particle 2 | Silica particles 1 | 0.25 | 3 | 0.40 | 5 |
| 7 | Toner particle 3 | Silica particles 1 | 0.25 | 3 | 0.40 | 5 |
| 8 | Toner particle 3 | Silica particles 5 | 0.25 | 3 | 0.40 | 5 |
| 9 | Toner particle 3 | Silica particles 6 | 0.25 | 3 | 0.40 | 5 |
| 10 | Toner particle 3 | Silica particles 7 | 0.25 | 3 | 0.40 | 5 |
| 11 | Toner particle 3 | Silica particles 7 | 0.30 | 5 | 0.40 | 5 |
| 12 | Toner particle 3 | Silica particles 8 | 0.25 | 3 | 0.40 | 5 |
| 13 | Toner particle 3 | Silica particles 9 | 0.25 | 3 | 0.40 | 5 |
| 14 | Toner particle 3 | Silica particles 8 | 0.15 | 3 | 0.40 | 5 |
| 15 | Toner particle 3 | Silica particles 10 | 0.25 | 3 | 0.40 | 5 |

TABLE 2-1-continued

| Toner No. | Toner particle | Silica particles | Pre-mixing Power (W/g) | Pre-mixing Processing time (min) | External addition and mixing Power (W/g) | External addition and mixing Processing time (min) |
|---|---|---|---|---|---|---|
| 16 | Toner particle 3 | Silica particles 11 | 0.30 | 5 | 0.40 | 5 |
| 17 | Toner particle 3 | Silica particles 12 | 0.30 | 5 | 0.40 | 5 |
| Comparison1 | Toner particle 3 | Silica particles 8 | Described in the body text | | | |
| Comparison2 | Toner particle 3 | Silica particles 13 | 0.25 | 3 | 0.40 | 5 |
| Comparison3 | Toner particle 3 | Silica particles 14 | 0.30 | 5 | 0.40 | 5 |
| Comparison4 | Toner particle 3 | Silica particles 12 | 0.15 | 3 | 0.40 | 5 |
| Comparison5 | Toner particle 3 | Silica particles 15 | Described in the body text | | | |
| Comparison6 | Toner particle 3 | Silica particles 16 and RY300 | Described in the body text | | | |
| Comparison7 | Toner particle 3 | Silica particles 17 and NY90 | Described in the body text | | | |
| Comparison8 | Toner particle 3 | Silica particles 11 | 0.35 | 5 | 0.40 | 5 |

TABLE 2-2

| Toner No. | Analysis Rb | Ra | Rb/Ra | Number proportion of agglomerates (%) | A | B | A/B | Coefficient of variation | Moisture mass % |
|---|---|---|---|---|---|---|---|---|---|
| 1 | 25 | 7 | 3.6 | 90 | 158 | 40 | 4.0 | 2.25 | 0.15 |
| 2 | 25 | 7 | 3.6 | 70 | 158 | 40 | 4.0 | 1.50 | 0.15 |
| 3 | 25 | 7 | 3.6 | 90 | 158 | 40 | 4.0 | 2.25 | 0.15 |
| 4 | 25 | 7 | 3.6 | 90 | 158 | 40 | 4.0 | 2.25 | 0.15 |
| 5 | 25 | 7 | 3.6 | 90 | 158 | 40 | 4.0 | 2.25 | 0.15 |
| 6 | 25 | 7 | 3.6 | 90 | 158 | 40 | 4.0 | 2.25 | 0.40 |
| 7 | 25 | 7 | 3.6 | 90 | 158 | 40 | 4.0 | 2.25 | 0.50 |
| 8 | 25 | 7 | 3.6 | 90 | 150 | 50 | 3.0 | 2.25 | 0.50 |
| 9 | 25 | 7 | 3.6 | 90 | 140 | 23 | 6.0 | 2.25 | 0.50 |
| 10 | 25 | 7 | 3.6 | 90 | 173 | 27 | 6.4 | 2.25 | 0.50 |
| 11 | 25 | 7 | 3.6 | 40 | 173 | 27 | 6.4 | 1.45 | 0.50 |
| 12 | 25 | 5 | 5.0 | 90 | 173 | 27 | 6.4 | 2.25 | 0.50 |
| 13 | 75 | 30 | 2.5 | 90 | 173 | 27 | 6.4 | 2.25 | 0.50 |
| 14 | 40 | 5 | 8.0 | 93 | 173 | 27 | 6.4 | 3.00 | 0.50 |
| 15 | 25 | 5 | 5.0 | 90 | 120 | 20 | 6.0 | 2.25 | 0.50 |
| 16 | 12 | 5 | 2.4 | 40 | 300 | 43 | 6.9 | 1.48 | 0.50 |
| 17 | 80 | 33 | 2.4 | 40 | 158 | 24 | 6.6 | 1.46 | 0.50 |
| Comparison1 | 40 | 5 | 8.0 | 93 | 173 | 27 | 6.4 | 3.50 | 0.50 |
| Comparison2 | 25 | 5 | 5.0 | 35 | 108 | 20 | 5.4 | 1.70 | 0.50 |
| Comparisons | 12 | 5 | 2.4 | 96 | 350 | 47 | 7.4 | 3.20 | 0.50 |
| Comparison4 | 90 | 33 | 2.7 | 95 | 158 | 24 | 6.6 | 3.10 | 0.50 |
| Comparisons | 12 | 7 | 1.7 | 35 | 98 | 28 | 3.5 | 1.20 | 0.50 |
| Comparison6 | 12 | 7 | 1.7 | 95 | 45 | 18 | 2.5 | 3.20 | 0.50 |
| Comparison7 | 33 | 13 | 2.5 | 95 | 105 | 25 | 4.2 | 3.50 | 0.50 |
| Comparison8 | 10 | 5 | 2.0 | 30 | 300 | 43 | 6.9 | 1.48 | 0.50 |

In the table, A represents the parameter A, and B represents the parameter B. The coefficient of variation means a coefficient of variation of particle diameters based on the number of agglomerates.

Example 1

Durability Evaluation

The following evaluation was conducted using the toner 1. The evaluation was conducted in an environment at 32.5° C. and 80% RH. For a fixing media, an A4 size OceRed-Label paper sheet (basis weight: 80 $g/m^2$), manufactured by Canon Inc., was used. A commercially available LBP-3100 (manufactured by Canon Inc.) was used as the image forming apparatus, and a modified machine in which the printing speed was modified from 16 sheets/min to 40 sheets/min was used.

A horizontal line image with a print percentage of 1.5% was printed for 8,000 sheets in an intermittent mode. At the time when another 8,000 sheets had been printed, the toner cartridge was removed, the toner cartridge was shaken 30 times, and the image was outputted again. By shaking the toner cartridge, the deteriorated toner on the developing roller is mixed with the relatively undegraded toner in the toner cartridge container, and as a result, the charging performance of the toner on the developing roller tends to be broad. Therefore, the evaluations on fog and fog irregularity are very severe. The following evaluation was conducted, and good results were obtained. Table 3 shows the obtained evaluation results.

Image Density

Image density was measured by forming a solid black image part, and the density of the solid black image was measured using Macbeth Transmission Reflection Densitometer (manufactured by Macbeth Corporation). It should be noted that a higher image density is better.

Fog

A solid white image was outputted, and the reflectance thereof was measured using REFLECTMETER MODEL TC-6DS, manufactured by Tokyo Denshoku Co., Ltd. Meanwhile, the reflectance of a transfer paper sheet (standard paper sheet) before the solid white image formation was also measured. A green filter was used as the filter. From the reflectance before and after the output of the solid white image, the fog was calculated using the following expression.

Fog (reflectance) (%)=Reflectance of standard paper sheet (%)−Reflectance of solid white image sample (%)

It should be noted that a lower fog (reflectance) is better. The average value of the fog values evaluated at 10 points on a single evaluation image is taken as the average fog, and the maximum value is taken as the maximum fog. The maximum fog is particularly increased because fog is outputted as an irregular image due to the occurrence of the irregular charging performance of toner.

Examples 2 to 17

An evaluation was conducted using toners 2 to 17 in a similar manner to Example 1, and good results were obtained.

Table 3 shows the evaluation results.

TABLE 3

| | | Initial image evaluation | | 8000 sheets | | | After cartridge shaking | | |
|---|---|---|---|---|---|---|---|---|---|
| Examples | Toner | Solid | Fog (%) | Solid | Average fog (%) | Maximum fog (%) | Solid | Average fog (%) | Maximum fog (%) |
| Example 1 | Toner 1 | 1.45 | 1.3 | 1.39 | 1.5 | 2.1 | 1.37 | 2.1 | 2.6 |
| Example 2 | Toner 2 | 1.45 | 1.2 | 1.38 | 1.6 | 2.3 | 1.37 | 2.2 | 2.5 |
| Example 3 | Toner 3 | 1.46 | 1.1 | 1.39 | 1.5 | 2.2 | 1.36 | 2.1 | 2.4 |
| Example 4 | Toner 4 | 1.45 | 1.3 | 1.40 | 1.6 | 2.1 | 1.37 | 2.3 | 2.6 |
| Example 5 | Toner 5 | 1.45 | 1.2 | 1.50 | 1.4 | 2.0 | 1.38 | 2.1 | 2.7 |
| Example 6 | Toner 6 | 1.43 | 1.4 | 1.36 | 1.6 | 2.4 | 1.32 | 2.4 | 2.9 |
| Example 7 | Toner 7 | 1.44 | 1.4 | 1.36 | 1.6 | 2.3 | 1.33 | 2.6 | 3.2 |
| Example 8 | Toner 8 | 1.45 | 1.5 | 1.36 | 1.5 | 2.4 | 1.32 | 2.7 | 3.5 |
| Example 9 | Toner 9 | 1.42 | 1.3 | 1.35 | 1.5 | 2.3 | 1.33 | 2.6 | 3.1 |
| Example 10 | Toner 10 | 1.43 | 1.3 | 1.34 | 1.8 | 2.5 | 1.31 | 2.9 | 3.6 |
| Example 11 | Toner 11 | 1.41 | 1.2 | 1.36 | 1.9 | 2.5 | 1.32 | 3.1 | 3.8 |
| Example 12 | Toner 12 | 1.43 | 1.3 | 1.35 | 1.6 | 2.6 | 1.32 | 3.3 | 3.9 |
| Example 13 | Toner 13 | 1.43 | 1.3 | 1.31 | 1.5 | 2.6 | 1.27 | 3.3 | 4.1 |
| Example 14 | Toner 14 | 1.41 | 1.5 | 1.26 | 1.6 | 2.7 | 1.25 | 3.5 | 4.2 |
| Example 15 | Toner 15 | 1.39 | 1.4 | 1.24 | 1.7 | 2.5 | 1.23 | 3.6 | 4.3 |
| Example 16 | Toner 16 | 1.44 | 1.6 | 1.25 | 1.6 | 2.6 | 1.22 | 3.6 | 4.5 |
| Example 17 | Toner 17 | 1.41 | 1.5 | 1.23 | 1.5 | 2.6 | 1.21 | 3.5 | 4.2 |

In the table, the solid indicates the image density of a solid black image.

Comparative Examples 1 to 8

An examination was conducted using comparative toners 1 to 8 in a similar manner to Example 1. Table 4 shows the evaluation results.

TABLE 4

| | | Initial image evaluation | | 8000 sheets | | | After cartridge shaking | | |
|---|---|---|---|---|---|---|---|---|---|
| Comparative Examples | Toner | Solid | Fog (%) | Solid | Average fog (%) | Maximum fog (%) | Solid | Average fog (%) | Maximum fog (%) |
| Comparative Example 1 | Comparative toner 1 | 1.41 | 1.5 | 1.19 | 1.9 | 2.6 | 1.11 | 4.2 | 5.8 |
| Comparative Example 2 | Comparative toner 2 | 1.42 | 1.4 | 1.15 | 1.8 | 2.7 | 1.13 | 4.0 | 6.1 |
| Comparative Example 3 | Comparative toner 3 | 1.42 | 1.5 | 1.21 | 1.6 | 2.4 | 1.14 | 4.3 | 6.8 |
| Comparative Example 4 | Comparative toner 4 | 1.38 | 1.6 | 1.16 | 1.9 | 2.8 | 1.02 | 4.4 | 6.5 |
| Comparative Example 5 | Comparative toner 5 | 1.36 | 1.9 | 1.15 | 2.1 | 3.3 | 1.03 | 4.9 | 7.2 |
| Comparative Example 6 | Comparative toner 6 | 1.33 | 1.7 | 1.19 | 2.3 | 3.2 | 1.07 | 4.7 | 7.7 |

TABLE 4-continued

| Comparative Examples | Toner | Initial image evaluation Solid | Fog (%) | 8000 sheets Solid | Average fog (%) | Maximum fog (%) | After cartridge shaking Solid | Average fog (%) | Maximum fog (%) |
|---|---|---|---|---|---|---|---|---|---|
| Comparative Example 7 | Comparative toner 7 | 1.34 | 1.6 | 1.17 | 2.1 | 3.9 | 1.13 | 5.2 | 8.0 |
| Comparative Example 8 | Comparative toner 8 | 1.32 | 1.6 | 1.06 | 2.5 | 4.2 | 1.0 | 5.6 | 8.5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120734, filed Jul. 21, 2021, which is hereby incorporated by reference herein in its entirety.

What is claimed is:

1. A toner, comprising:

a toner particle; and an external additive on a surface of the toner particle, the external additive comprising an agglomerate of fine silica particles surface-treated with silicone oil, wherein Rb is 12 to 80 nm when Rb is a number-average particle diameter of the agglomerate of the fine silica particles, A is 120 to 300 when A is an integrated value of a D unit obtained when an integrated value of a Q unit is set to 100 in a CP/MAS measurement in a $^{29}$Si-solid-state NMR of the fine silica particles, and the agglomerate of the fine silica particles has a coefficient of variation of particle diameters of 1.00 to 3.00, based on a number of the agglomerate of the fine silica particles.

2. The toner according to claim 1, wherein Ra is 5 to 30 nm when Ra is a number-average particle diameter of primary particles of the fine silica particles.

3. The toner according to claim 1, wherein $2.5 \leq Rb/Ra \leq 5.0$ when Ra is a number-average particle diameter of the primary particles of the fine silica particles.

4. The toner according to claim 1, wherein the external additive further comprises a non-agglomerated form of fine silica particles surface-treated with silicone oil, and a number proportion of the agglomerate of the fine silica particles is 40 number % or more based on a total number of the agglomerate of the fine silica particles and the non-agglomerated form of the fine silica particles.

5. The toner according to claim 1, wherein the external additive further comprises the non-agglomerated form of fine silica particles surface-treated with silicone oil, and a total content of the agglomerate of the fine silica particles and the non-agglomerated form of the fine silica particles is 0.10 to 4.00 parts by mass based on 100 parts by mass of the toner particle.

6. The toner according to claim 1, wherein $3.0 \leq A/B \leq 6.0$ when B is an integrated value of a D unit obtained when an integrated value of a Q unit is set to 100 in a DD/MAS measurement in a $^{29}$Si-solid-state NMR of the fine silica particles.

7. The toner according to claim 1, wherein the toner has a moisture content of 0.40 mass % or less.

8. The toner according to claim 1, wherein the silicone oil comprises modified silicone oil.

9. The toner according to claim 8, wherein the modified silicone oil is a compound represented by formula (B)

(B)

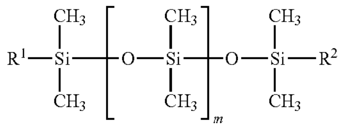

where $R^1$ represents a carbinol group, a hydroxy group, an epoxy group, a carboxy group, an alkyl group or a hydrogen atom, $R^2$ represents a carbinol group, a hydroxy group, an epoxy group, a carboxy group or a hydrogen atom, and m represents an average repeating unit number, with the proviso that methyl groups in a side chain in formula (B) may independently be replaced with a carbinol group, a hydroxy group, an epoxy group, a carboxy group or a hydrogen atom, wherein a kinematic viscosity of the modified silicone oil represented by formula (B) is 20 to 1000 $mm^2/s$ at a temperature of 25° C.

* * * * *